United States Patent
Murata et al.

(10) Patent No.: US 9,517,754 B2
(45) Date of Patent: *Dec. 13, 2016

(54) ELECTRIC PARKING BRAKE CONTROL DEVICE

(71) Applicant: ADVICS CO., LTD., Kariya (JP)

(72) Inventors: Shunsuke Murata, Ama-gun (JP); Masatoshi Hanzawa, Kariya (JP); Tuyoshi Ando, Toyota (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 36 days.

This patent is subject to a terminal disclaimer.

(21) Appl. No.: 14/414,660

(22) PCT Filed: Jul. 16, 2013

(86) PCT No.: PCT/JP2013/069257
§ 371 (c)(1),
(2) Date: Jan. 13, 2015

(87) PCT Pub. No.: WO2014/013971
PCT Pub. Date: Jan. 23, 2014

(65) Prior Publication Data
US 2015/0175137 A1  Jun. 25, 2015

(30) Foreign Application Priority Data
Jul. 16, 2012 (JP) .................................. 2012-158215

(51) Int. Cl.
*B60T 7/12* (2006.01)
*B60T 8/32* (2006.01)
(Continued)

(52) U.S. Cl.
CPC ............... *B60T 7/122* (2013.01); *B60T 7/042* (2013.01); *B60T 7/107* (2013.01); *B60T 8/17* (2013.01);
(Continued)

(58) Field of Classification Search
CPC .......... B60T 7/122; B60T 7/042; B60T 7/107; B60T 8/3205; B60T 8/17; B60T 8/32; B60T 8/245; B60T 13/741; B60T 13/588; B60T 2201/08
See application file for complete search history.

(56) References Cited

U.S. PATENT DOCUMENTS 6,394,235 B1 * 5/2002 Poertzgen ............. B60T 13/741
303/3
6,997,289 B2  2/2006 Iwagawa et al.
(Continued)

FOREIGN PATENT DOCUMENTS

JP          11-147458 A     6/1999
JP        2003-327101 A    11/2003
(Continued)

OTHER PUBLICATIONS

International Search Report (PCT/ISA/210) mailed on Aug. 13, 2013, by the Japanese Patent Office as the International Searching Authority for International Application No. PCT/JP2013/069257.

*Primary Examiner* — Dale W Hilgendorf
(74) *Attorney, Agent, or Firm* — Buchanan Ingersoll & Rooney PC

(57) ABSTRACT

The electric parking brake control device performs accelerator release control for moving a friction-applying member to a standby position when a vehicle starting operation is performed, the standby position being positioned between a locked position and a released position such that friction-applying member moves from the standby position to the locked position within a time which is shorter than a time (Continued)

required to move from the released position to the locked position. The electric parking brake control device determines whether it is unnecessary to maintain the standby position, based on whether a state in which a vehicle speed exceeds a specific speed threshold value is maintained for a predetermined period of time. The release control is performed when the electric parking brake control device determines that it is unnecessary to maintain the standby position.

9 Claims, 19 Drawing Sheets

(51) Int. Cl.
  B60T 8/17       (2006.01)
  B60T 7/04       (2006.01)
  B60T 13/74      (2006.01)
  B60T 7/10       (2006.01)
  B60T 13/58      (2006.01)
  B60T 8/24       (2006.01)
(52) U.S. Cl.
  CPC ............ B60T 8/3205 (2013.01); B60T 13/588 (2013.01); B60T 13/741 (2013.01); *B60T 8/245* (2013.01); *B60T 8/32* (2013.01); *B60T 2201/08* (2013.01)

(56) References Cited

U.S. PATENT DOCUMENTS

| | | | |
|---|---|---|---|
| 7,389,172 B2 | 6/2008 | Sugano | |
| 7,647,153 B2 | 1/2010 | Sugano | |
| 7,813,859 B2* | 10/2010 | Aizawa | B60T 7/122 |
| | | | 701/70 |
| 7,881,849 B2* | 2/2011 | Shiraki | B60T 13/746 |
| | | | 701/70 |
| 7,908,071 B2 | 3/2011 | Nakayama | |
| 9,180,844 B2* | 11/2015 | Murata | B60T 13/741 |
| 2004/0226768 A1* | 11/2004 | DeLuca | B60T 13/662 |
| | | | 180/275 |
| 2008/0084109 A1* | 4/2008 | Griffith | B60T 13/746 |
| | | | 303/89 |
| 2009/0206650 A1* | 8/2009 | Ninoyu | B60T 13/588 |
| | | | 303/3 |
| 2009/0280959 A1* | 11/2009 | Bensch | B60T 13/588 |
| | | | 477/198 |
| 2010/0072811 A1* | 3/2010 | Kondo | B60T 13/588 |
| | | | 303/20 |
| 2012/0292139 A1* | 11/2012 | Hanzawa | B60T 13/588 |
| | | | 188/72.3 |

FOREIGN PATENT DOCUMENTS

| | | |
|---|---|---|
| JP | 2005-219724 A | 8/2005 |
| JP | 2005-231382 A | 9/2005 |
| JP | 2006-076427 A | 3/2006 |
| JP | 2008-094142 A | 4/2008 |
| JP | 2008-094239 A | 4/2008 |
| JP | 2009-121372 A | 6/2009 |

\* cited by examiner

FIG.15

| SPEED [km/h] | GRADIENT [%] | | | | | | | |
|---|---|---|---|---|---|---|---|---|
| | 0 | 5 | 10 | 15 | 20 | 25 | 30 | 35 |
| 5 | 1 | 3 | 5 | 6 | 7 | 8 | 9 | 10 |
| 10 | 0.5 | 1 | 3 | 4 | 5 | 6 | 7 | 8 |
| 15 | 0.1 | 0.1 | 1 | 1.5 | 2 | 2.5 | 3.5 | 5 |
| 20 | 0.1 | 0.1 | 0.1 | 0.1 | 0.1 | 1 | 2 | 3 |
| 25 | 0.1 | 0.1 | 0.1 | 0.1 | 0.1 | 0.1 | 0.1 | 1 |
| 30 | 0.1 | 0.1 | 0.1 | 0.1 | 0.1 | 0.1 | 0.1 | 0.1 |
| 35 | 0.1 | 0.1 | 0.1 | 0.1 | 0.1 | 0.1 | 0.1 | 0.1 |
| 40 | 0.1 | 0.1 | 0.1 | 0.1 | 0.1 | 0.1 | 0.1 | 0.1 |
| 45 | 0.1 | 0.1 | 0.1 | 0.1 | 0.1 | 0.1 | 0.1 | 0.1 |
| 50 | 0.1 | 0.1 | 0.1 | 0.1 | 0.1 | 0.1 | 0.1 | 0.1 |

ELECTRIC PARKING BRAKE CONTROL DEVICE

TECHNICAL FIELD

The present invention relates to an electric parking brake (hereinafter referred to as an EPB) control device that controls an EPB to inhibit a vehicle from sliding downward when the vehicle is started on a slope.

BACKGROUND ART

In related art, PTL 1 proposes an EPB control device that is capable of securing the safety of a vehicle when the engine of a manual transmission vehicle that is provided with the EPB stalls (hereinafter referred to as an engine stall) when the vehicle is started on a slope. The EPB control device detects the engine stall and inhibits the vehicle from sliding downward on the slope by actuating the EPB when the engine stall is detected.

CITATION LIST

Patent Literature

[PTL 1]
Japanese Laid-Open Patent Publication NO. JP-A-2008-094142

SUMMARY OF INVENTION

Technical Problem

However, in the EPB control device disclosed in the above-described PTL 1, as the safety of the vehicle is secured by actuating the EPB from a normal EPB released state, namely, a released state, and by controlling wheels to be put into a locked state (hereinafter referred to as lock control), it takes time for the vehicle to stop after an engine stall is detected. More specifically, as brake pads are moved from the normal EPB released state, in which the brake pads are separated from a brake disc, and pressed against the brake disc to generate a braking force with respect to the wheels, it takes time for the brake pads to reach that state. Thus, there is a possibility that the vehicle slides down on a slope. In particular, an engine stall often occurs when an accelerator is not sufficiently depressed on a slope. Therefore, there has been a case in which the vehicle slides downward significantly on a steep slope.

Therefore, for the purpose of inhibiting the vehicle from sliding downward when the vehicle is started on a slope, it is possible to consider improving the responsiveness of the EPB by having a standby state, in which a clearance between the brake pads and the brake disc is made smaller than the clearance obtained at the time of standby in the normal released state, when the vehicle is started.

However, when such a standby state is obtained, although the responsiveness is improved, it is also highly likely that brake drag may be caused when the vehicle is started, as the clearance between the brake pads and the brake disc is made smaller. As a result, there is a risk that noise, vibration or overheating of the brake is caused by the brake drag after the vehicle is started. In contrast to this, it is possible to consider releasing the above-described standby state by assuming that the vehicle has been started normally when a vehicle speed reaches or exceeds a predetermined speed threshold. However, depending on the speed threshold, there is a possibility that the brake drag continues for a long time when the vehicle is travelling at a low speed, for example, when the vehicle is travelling in traffic congestion.

Note that a situation in which the vehicle may slide downward at the time of being started is not limited to a case when the vehicle is operated to move forward uphill, i.e., while facing an uphill road, and a similar situation also arises in a case when the vehicle is operated to move backward uphill, i.e., while facing a downhill road.

In the light of the foregoing, it is an object of the present invention to provide an EPB control device that is capable of inhibiting a vehicle from sliding downward when the engine of the vehicle engine stalls when the vehicle is started on a slope, and of inhibiting brake drag.

Solution to Problem

In order to achieve the above-described object, the invention in a first aspect includes: lock control means for moving a friction-applying member to a locked position at which a predetermined braking force is generated, by actuating an electric actuator such that, in an EPB, the friction-applying member is pushed against a friction-applied member; release control means for moving the friction-applying member to a released position in which the friction-applying member is separated from the friction-applied member, at a time when the EPB is not actuated; accelerator release control means that performs accelerator release control for moving the friction-applying member to a standby position when a vehicle starting operation is performed, the standby position being positioned between the locked position and the released position such that the friction-applying member moves caused by operation of the electric actuator from the standby position to the locked position within a time which is shorter than a time required to move from the released position to the locked position; and non-necessity confirmation determining means for determining whether it is unnecessary to maintain the standby position, based on whether a state in which a vehicle speed, which is a speed of the vehicle, exceeds a specific speed threshold value is maintained for a predetermined period of time. Release control is performed when the non-necessity confirmation determining means determines that it is unnecessary to maintain the standby position.

In this manner, it is determined that there is no possibility that an engine will stop when the state in which the vehicle speed exceeds the specific speed threshold value is maintained for the predetermined period of time. When there is a possibility that the engine will stop, the standby position of the EPB is positioned closer to the locked position side than to the released position, namely, is caused be in the standby position in which the friction-applying member can be pressed against the friction-applied member within the shorter period of time. By this, it is possible to improve the responsiveness of the EPB so as to generate a parking brake force quickly at a time of an engine stall and to inhibit the vehicle from sliding downward.

Then, in the case in which the responsiveness of the EPB is improved so as to inhibit the vehicle from sliding downward in this manner, it is accurately determined whether a non-necessity confirmation state is obtained, and immediately after the non-necessity confirmation state is obtained, the release control is performed. Thus, it becomes possible to return a clearance between the friction-applied member and the friction-applying member [to that of the normal released state immediately after it is determined that it is unnecessary to maintain the standby position. Therefore, it is possible to inhibit dragging of the brake when the vehicle is started.

For example, as in the invention in a second aspect, the accelerator release control means can perform the accelerator release control when the vehicle starting operation is performed in the lock control or in a locked state, the locked state is a state in which the locked position is continued to be maintained.

The invention described in a third aspect includes: accelerator release control determining means for causing the propeller shaft to be moved to a standby position, which is positioned between a locked position in which the locked state is obtained and a released position in which the released state is obtained, when a vehicle starting operation is performed in the lock control or in the locked state; starting state determining means for determining whether a vehicle is in an impossible-to-start state in which a vehicle cannot start traveling after the vehicle starting operation is performed; standby cancel release control means for performing the release control to cause the propeller shaft to be moved from the standby position to the released position when the starting state determining means has not determined that the vehicle is in the impossible-to-start state; under-impossible-to-start lock control means for performing under-impossible-to-start lock control to generate a parking brake force by moving the propeller shaft in the one direction as a result of the motor being driven and rotated in the forward direction when the starting state determining means determines the vehicle is in the impossible-to-start state; and non-necessity confirmation determining means for determining whether a non-necessity confirmation state is obtained in which it is unnecessary to perform the under-impossible-to-start lock control, based on whether a state in which a vehicle speed exceeds a specific speed threshold value is maintained for a period of time equal to or longer than a predetermined time threshold value; wherein the standby cancel release control means causes the release control to be performed to move the propeller shaft from the standby position to the released position when the starting state determining means has not determined that it is impossible to start the vehicle and when the non-necessity confirmation determining means has determined that the non-necessity confirmation state is obtained.

In this manner, when the vehicle is stopped on a slope, the standby position of the propeller shaft is positioned closer to the locked position side than to the released position, namely, is caused be in the standby position in which the friction-applying member can be pressed against the friction-applied member within the shorter period of time. By this, it is possible to improve the responsiveness of the EPB so as to generate a parking brake force quickly at a time of an engine stall and to inhibit the vehicle from sliding downward.

Then, in the case in which the responsiveness of the EPB is improved so as to inhibit the vehicle from sliding downward in this manner, it is accurately determined whether the non-necessity confirmation state is obtained, and immediately after the non-necessity confirmation state is obtained, the release control is performed. Thus, it becomes possible to return a clearance between the friction-applied member and the friction-applying member to that of the normal released state immediately after it is determined that it is unnecessary to perform the under-impossible-to-start lock control and unnecessary to maintain the standby position. Therefore, it is possible to inhibit dragging of the brake when the vehicle is started.

For example, as in the invention described in a fourth aspect, the specific speed threshold value is set to a larger value as a gradient of a road surface on which the vehicle is driven becomes larger. Further, as in the invention described in a fifth aspect, the time threshold value is set to a larger value as a gradient of a road surface on which the vehicle is driven becomes larger. In this manner, when the road surface on which the vehicle travels is closer to a flat surface road or when the vehicle speed is larger, it is less likely for an engine stall to occur. Thus, it is possible to set a non-necessity confirmation time in accordance with the gradient of the road surface and the vehicle speed.

In the invention described in sixth aspect, non-necessity confirmation determining means determines that the non-necessity confirmation state is obtained when both a first condition and a second condition are satisfied. The first condition is satisfied when a state in which a vehicle speed exceeds a specific speed threshold value is maintained for a period of time equal to or longer than a predetermined time threshold value. The second condition is satisfied when a state is obtained in which an engine torque exceeds a pre-set target engine torque or an engine rotation speed exceeds a pre-set target engine rotation speed and when a state is obtained in which an operation amount of a clutch of the vehicle exceeds a pre-set target operation amount.

When the second condition is satisfied, it is assumed that a driver has an intention to start the vehicle, namely, that the driver is appropriately depressing an accelerator pedal and performing a clutch pedal operation to an extent that the driver is thinking that he/she wants to start the vehicle. Thus, by determining that the non-necessity confirmation state is obtained when the second condition is satisfied as well as the first condition, it is possible to determine whether the non-necessity confirmation state is obtained while more effectively taking into account the driver's intention to start the vehicle.

In the invention described in a seventh aspect, non-necessity confirmation determining means determines that a non-necessity confirmation state is obtained if a state in which a vehicle speed exceeds a specific speed threshold value is maintained for a period of time equal to or longer than a predetermined time threshold value, when neither traction control nor anti-skid control is actuated. In the same manner, in the invention described in an eighth aspect, non-necessity confirmation determining means determines that the non-necessity determined state is obtained if a state in which a vehicle speed exceeds a specific speed threshold value is maintained for a period of time equal to or longer than a predetermined time threshold value, when the vehicle is not turning.

When the traction control or the anti-skid control is being actuated, it is highly likely that a state of the vehicle becomes unstable when the vehicle has an engine stall because the state of the vehicle is not stable. Further, it is possible that the vehicle is also put into the unstable state when the vehicle falls into an engine stall while the vehicle is in a turning state. Therefore, in those cases, it is preferable to maintain the accelerator release standby state. By doing so, it is possible to inhibit a case in which it is determined that the non-necessity confirmation state is obtained even though it is highly likely that an engine stall will occur. Further, as a braking force is promptly generated to stop the vehicle at the time when the engine stall occurs, it is possible to inhibit the vehicle from being put into the unstable state.

In the invention described in a ninth aspect, non-necessity confirmation determining means determines that a non-necessity determined state is obtained when a state in which the vehicle speed is less than a certain value is maintained for a period of time equal to or longer than a certain period of time even in a situation in which an engine torque exceeds a pre-set target engine torque and an operation amount of a clutch exceeds a target operation amount.

Such a situation is a case in which the vehicle speed does not increase even when the driver is appropriately depressing the accelerator pedal and performing the clutch pedal operation to the extent that the driver is thinking that he/she wants to start the vehicle. In this case, it is considered that a state exists in which dragging of the brake is occurring. Thus, when this condition is satisfied, as it is considered that the state exists in which the dragging of the brake is occurring, it is possible to inhibit the dragging of the brake by causing the accelerator release standby state to be released.

BRIEF DESCRIPTION OF DRAWINGS

FIG. 15 is a map that is used for setting an engine stall non-necessity confirmation time.

DESCRIPTION OF EMBODIMENTS

Figure 1:
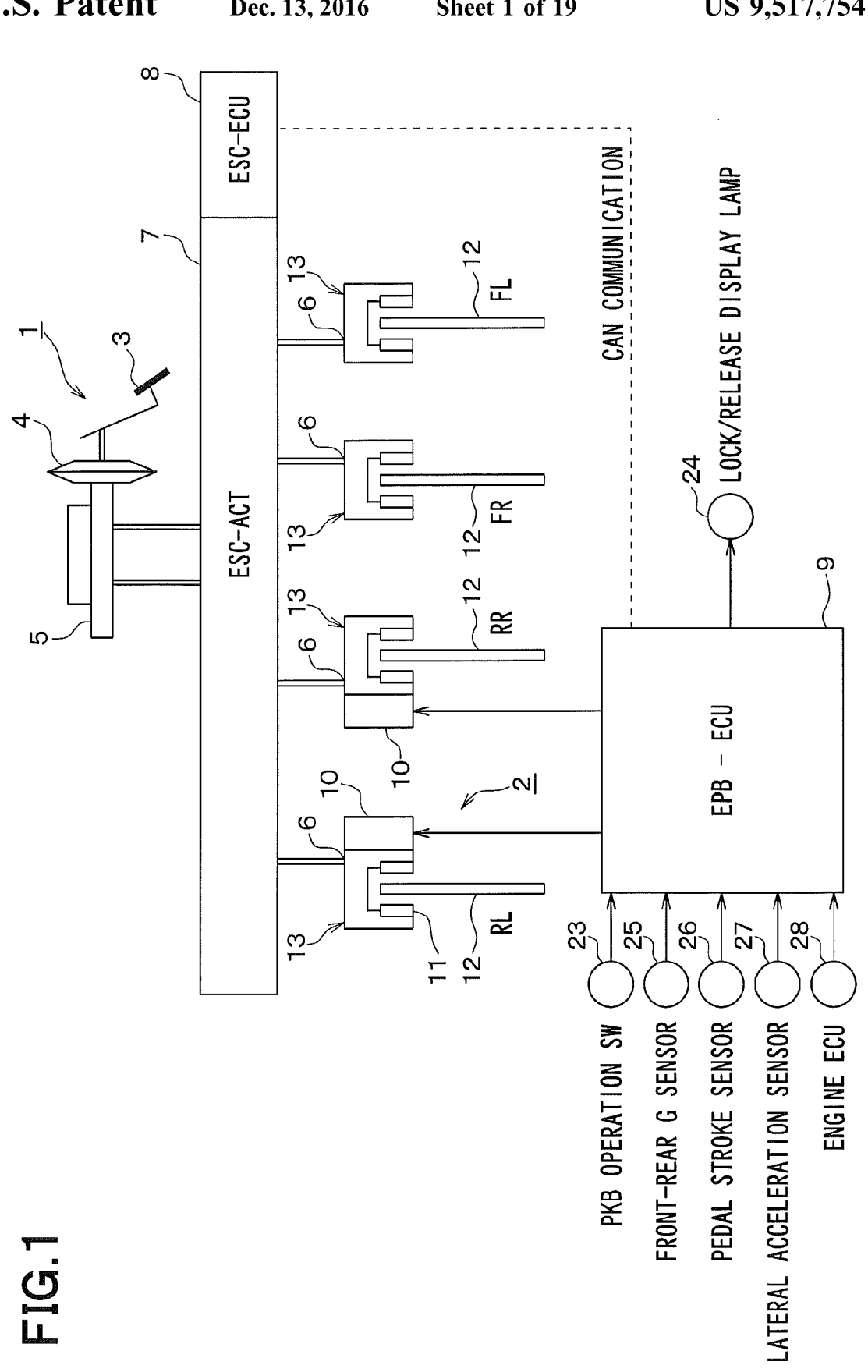
FIG. 1 is a schematic diagram showing an overall outline of a brake system for a vehicle to which an EPB control device according to a first embodiment of the present invention is applied.

Hereinafter, embodiments of the present invention will be explained based on the drawings. Note that, in the respective embodiments below, portions that are the same or equivalent to each other are explained by assigning the same reference numerals thereto.

First Embodiment

Figure 2:
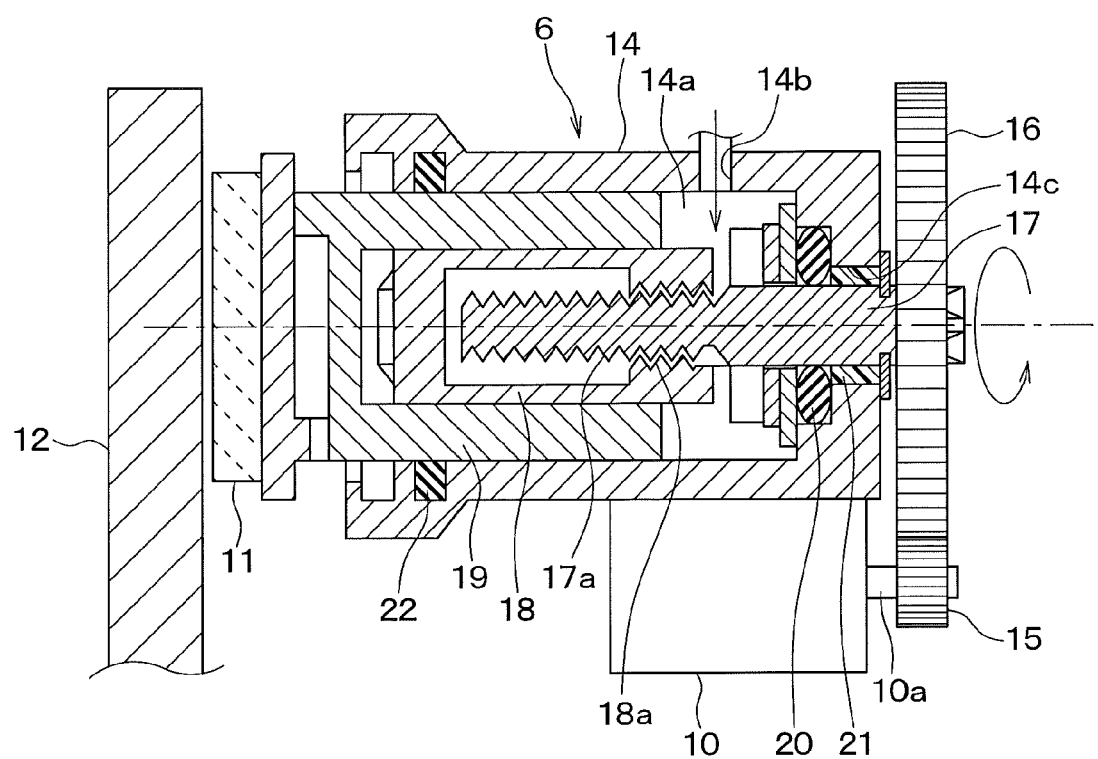
FIG. 2 is a cross-sectional schematic diagram of a rear wheel brake mechanism that is provided in the brake system.

A first embodiment of the present invention will be explained. In the present embodiment, a vehicle brake system in which a disc brake type EPB is applied to a rear wheel system will be explained as an example. FIG. 1 is a schematic diagram showing an overall outline of the vehicle brake system to which an EPB control device according to the present embodiment is applied. Further, FIG. 2 is a cross-sectional schematic diagram of a rear wheel brake mechanism provided in the brake system. Hereinafter, an explanation will be made with reference to these drawings.

As shown in FIG. 1, the brake system is provided with a service brake 1 that generates a service braking force based on a pedal depression force of a driver, and an EPB 2 that regulates movement of a vehicle at the time of parking or the like.

The service brake 1 boosts the pedal depression force that corresponds to the depression of a brake pedal 3 by the driver, using a servo unit 4. After that, a brake fluid pressure corresponding to the boosted pedal depression force is generated in a master cylinder (hereinafter referred to as an M/C) 5. Then, the brake fluid pressure is transmitted to a wheel cylinder (hereinafter referred to as a W/C) 6, which is provided in a brake mechanism of each wheel, thereby generating the service braking force. Further, an actuator 7 for controlling the brake fluid pressure is provided between the M/C 5 and the W/C 6, and the service braking force to be generated by the service brake 1 is adjusted, thereby forming a structure in which various types of control (for example, anti-skid control etc.) to improve vehicle safety can be performed.

The various types of control using the actuator 7 are performed by an electronic stability control electronic control unit (ESC)-ECU 8. For example, the ESC-ECU 8 outputs a control current for controlling various types of control valves and a pump drive motor that are not shown in the drawings and that are provided in the actuator 7. The ESC-ECU 8 thereby controls a hydraulic circuit that is provided in the actuator 7, and controls a W/C pressure that is transmitted to the W/C 6. Thus, wheel slip avoidance or the like is performed and the safety of the vehicle is improved. For example, the actuator 7 includes, for each wheel, a pressure increase control valve and a pressure decrease control valve such that the W/C pressure can be controlled to be increased, maintained or reduced. The pressure increase control valve controls application, to the W/C 6, of either the brake fluid pressure generated in the M/C 5 or the brake fluid pressure generated by driving of the pump. The pressure decrease control valve reduces the W/C pressure by supplying the brake fluid in each of the W/Cs 6 to a reservoir. Further, the actuator 7 can realize an automatic pressurization function of the service brake 1 in which the W/C 6 can be automatically pressurized based on control of the driving of the pump and control of the various types of control valves, even when there is no brake operation. The structure of the actuator 7 is a known structure, and a detailed explanation thereof is therefore omitted here.

Meanwhile, the EPB 2 generates a parking brake force by controlling the brake mechanism using motors 10. The EPB 2 is configured such that it includes an EPB control device (hereinafter referred to as an EPB-ECU) 9 that controls the drive of the motors 10.

The brake mechanism is a mechanical structure that generates a braking force in the brake system of the present embodiment. A front wheel brake mechanism is a structure that generates a service braking force by an operation of the service brake 1. Meanwhile, the rear wheel brake mechanism is a dual-operation structure that generates a braking force in response to both the operation of the service brake 1 and the operation of the EPB 2. The front wheel brake mechanism is a generally used known brake mechanism, and does not include the mechanism that generates a parking brake force based on the operation of the EPB 2, unlike the rear wheel brake mechanism. Therefore, an explanation thereof is omitted here, and the rear wheel brake mechanism will be explained below.

Not only when the service brake 1 is actuated but also when the EPB 2 is actuated, the rear wheel brake mechanism presses a brake pad 11, which is a friction-applying member shown in FIG. 2, and a brake disc 12, which is a friction-applied member, is sandwiched by the brake pads 11. Thus, a frictional force is generated between the brake pads 11 and the brake disc 12 and the braking force is generated.

Specifically, in a caliper 13 shown in FIG. 1, the brake mechanism rotates the motor 10 that is directly fixed to a body 14 of the W/C 6 for pressing the brake pads 11, as shown in FIG. 2, and thereby rotates a spur gear 15 that is provided on a drive shaft 10a of the motor 10. Then, the brake mechanism transmits the torque of the motor 10 to a spur gear 16 that is meshed with the spur gear 15, and thereby moves the brake pads 11. Thus, the parking brake force by the EPB 2 is generated.

In the caliper 13, in addition to the W/C 6 and the brake pads 11, a part of an end face of the brake disc 12 is housed such that it is sandwiched between the brake pads 11. The W/C 6 is configured such that when brake fluid pressure is supplied to a hollow section 14a of the cylinder shaped body 14 through a passage 14b, W/C pressure is generated inside the hollow section 14a that is a brake fluid chamber. The W/C 6 is configured to include, in the hollow section 14a, a rotation shaft 17, a propeller shaft 18, a piston 19 and so on.

An end of the rotation shaft 17 is connected to the spur gear 16 through an insertion hole 14c that is formed in the body 14. When the spur gear 16 is rotated, the rotation shaft 17 is rotated along with the rotation of the spur gear 16. A male screw groove 17a is formed in an outer peripheral surface of the rotation shaft 17 at another end of the rotation shaft 17 that is on the opposite side to the end connected to the spur gear 16. Meanwhile, the other end of the rotation shaft 17 is inserted into the insertion hole 14c, and is thereby supported axially. More specifically, the insertion hole 14c is provided with an O-ring 20 and a bearing 21. The O-ring 20 prevents the brake fluid from leaking through between the rotation shaft 17 and an inner wall surface of the insertion hole 14c, while the bearing 21 axially supports the other end of the rotation shaft 17.

The propeller shaft 18 is a nut that is a hollow tubular member, and a female screw groove 18a that is engaged with the male screw groove 17a of the rotation shaft 17 is formed in an inner wall surface of the propeller shaft 18. For example, the propeller shaft 18 has a column shape or a polygonal column shape and is provided with an anti-rotation key, so that the propeller shaft 18 does not rotate around the rotation center of the rotation shaft 17 when the rotation shaft 17 rotates. Therefore, when the rotation shaft 17 is rotated, the meshing between the male screw groove 17a and the female screw groove 18a converts the torque of the rotation shaft 17 to a force that moves the propeller shaft 18 in the axial direction of the rotation shaft 17. When the drive of the motor 10 is stopped, the propeller shaft 18 stops at the same position due to the frictional force generated by the meshing between the male screw groove 17a and the female screw groove 18a. If the drive of the motor 10 is stopped when a target braking force is reached, the propeller shaft 18 can be held in that position.

The piston 19 is arranged to surround an outer periphery of the propeller shaft 18, and is formed by a bottomed cylindrical member or a bottomed polygonal cylindrical member. An outer peripheral surface of the piston 19 abuts against an inner wall surface of the hollow section 14a formed in the body 14. In order to inhibit leakage of the brake fluid from between the outer peripheral surface of the piston 19 and an inner wall surface of the body 14, a seal member 22 is provided on the inner wall surface of the body 14. Thus, the W/C pressure can be applied to an end face of the piston 19. The seal member 22 is used to generate a reaction force to pull back the piston 19 when release control is performed after lock control. Since the seal member 22 is provided, basically, even if the brake disc 12 that is inclined during rotation presses into the brake pad 11 and the piston 19 within a range that does not exceed an elastic deformation amount of the seal member 22, it is possible to push them back to the brake disc 12 side and to maintain the brake disc 12 and the brake pad 11 such that they have a predetermined clearance therebetween.

Further, when the propeller shaft 18 is provided with the anti-rotation key in order to ensure that it does not rotate around the rotation center of the rotation shaft 17 when the rotation shaft 17 rotates, the piston 19 is provided with a key groove along which the anti-rotation key slidingly moves. If the propeller shaft 18 has a polygonal column shape, the piston 19 is formed in a polygonal cylindrical shape that corresponds to that shape.

The brake pad 11 is provided at a leading end of the piston 19, and the brake pad 11 is moved in the left-right direction in the drawing along with the movement of the piston 19. More specifically, the piston 19 is configured such that it can move in the leftward direction in the drawing along with the movement of the propeller shaft 18, and also can move in the leftward direction in the drawing independently of the propeller shaft 18 when the W/C pressure is applied to an end of the piston 19 (an end that is on the opposite side to the end provided with the brake pad 11). If the brake fluid pressure in the hollow section 14a is not applied (W/C pressure=0) when the propeller shaft 18 is in a released position (a state before the motor 10 is rotated), which is a standby position when the propeller shaft 18 is in a normal released state, the piston 19 is moved in the rightward direction in the drawing by an elastic force of the seal member 22, which will be described later. The brake pad 11 is thereby moved away from the brake disc 12. If the W/C pressure becomes zero when the motor 10 is rotated and the propeller shaft 18 is moved from an initial position to the left in the drawing, the movement of the piston 19 in the rightward direction in the drawing is restricted by the moved propeller shaft 18, and the brake pad 11 is held at that position.

In the brake mechanism structured as described above, when the service brake 1 is operated, the W/C pressure generated by the operation of the service brake 1 causes the piston 19 to move in the leftward direction in the drawing.

As a result, the brake pads 11 are pressed against the brake disc 12, and the service braking force is thereby generated. Further, when the EPB 2 is operated, the motor 10 is driven and the spur gear 15 is rotated. Along with this, the spur gear 16 and the rotation shaft 17 are rotated, and the meshing between the male screw groove 17a and the female screw 18a causes the propeller shaft 18 to move to the brake disc 12 side (in the leftward direction in the drawing). Then, along with this, the leading end of the propeller shaft 18 comes into contact with a bottom surface of the piston 19 and presses the piston 19, and the piston 19 is also moved in the same direction. Thus, the brake pads 11 are pressed against the brake disc 12, and a parking brake force is thereby generated. Thus, it is possible to achieve a dual-operation brake mechanism that generates a braking force in response to both the operation of the service brake 1 and the operation of the EPB 2.

Further, in this type of brake mechanism, if the EPB 2 is actuated when the W/C pressure is 0 and before the brake pads 11 are pressed against the brake disc 12, or even when the W/C pressure is generated by the actuation of the service brake 1, in a state before the propeller shaft 18 is in contact with the piston 19, the load on the propeller shaft 18 is reduced and the motor 10 is driven with almost no load. When the brake disc 12 is pressed by the brake pads 11 in a state in which the propeller shaft 18 is in contact with the piston 19, the parking brake force by the EPB 2 is generated, a load is applied to the motor 10, and a value of a motor current that is caused to flow to the motor 10 changes. Therefore, by confirming the motor current value, it is possible to confirm a generation state of the parking brake force by the EPB 2.

The EPB-ECU 9 is configured by a well-known microcomputer that is provided with a CPU, a ROM, a RAM, an I/O and the like, and performs parking brake control by controlling the rotation of the motor 10 in accordance with a program stored in the ROM or the like. The EPB-ECU 9 corresponds to the EPB control device of the present invention.

The EPB-ECU 9 receives a signal etc. in accordance with an operation state of an operation switch (SW) 23 that is provided on an instrument panel (not shown in the drawings) in a vehicle compartment, for example, and drives the motor 10 in accordance with the operation state of the operation SW 23. Further, the EPB-ECU 9 performs lock control, release control and the like based on the motor current value. Based on the control state, the EPB-ECU 9 ascertains that the lock control is being performed or the wheel is in a locked state by the lock control, and that the release control is being performed or the wheel is in a released state (an EPB released state) by the release control. Then, in accordance with the drive state of the motor 10, the EPB-ECU 9 outputs a signal indicating whether the wheel is in the locked state or in the released state to a lock/release display lamp 24 that is provided on the instrument panel.

Note that the EPB-ECU 9 receives detection signals from a front-rear acceleration sensor (hereinafter referred to as a front-rear G sensor) 25 that detects an acceleration in the front-rear direction of the vehicle, a pedal stroke sensor 26 that detects a stroke of a clutch pedal, which is not shown in the drawings, and a lateral acceleration sensor 27 that detects a lateral acceleration, and also receives various types of data from an engine ECU 28. As a result, various types of calculations and data inputs are performed in the EPB-ECU 9. For example, in the EPB-ECU 9, an inclination (a gradient) of a road surface on which the vehicle is stopped is estimated using a known method, based on a gravitational acceleration component included in the detection signal from the front-rear G sensor 25, a clutch operation state is detected based on the pedal stroke sensor 26, and the lateral acceleration is detected based on the detection signal from the lateral acceleration sensor 27. Further, it is possible to understand a driving force, an engine torque, an engine rotation speed, etc. based on the data from the engine ECU 28.

In the vehicle brake system structured as described above, basically, an operation to generate a braking force for the vehicle is performed by generating a service braking force by the service brake 1 when the vehicle is travelling. Further, when the vehicle is stopped by the service brake 1, the vehicle stopped state is maintained if the driver depresses the operation SW 23 to actuate the EPB 2 and thereby generates a parking brake force, or thereafter an operation to release the parking brake force is performed. More specifically, the operation of the service brake 1 is such that, if a brake pedal operation is performed by the driver when the vehicle is travelling, the brake fluid pressure generated in the M/C 5 is transmitted to the W/C 6, thereby generating a service braking force. Meanwhile, the operation of the EPB 2 is such that the piston 19 is moved by driving the motor 10 and the parking brake force is generated by pressing the brake pads 11 against the brake disc 12, thereby causing the wheel to be locked, or the parking brake force is released by separating the brake pads 11 from the brake disc 12, thereby causing the wheel to be released.

Specifically, the parking brake force is generated or released by loeldrelease control. In the lock control, the EPB 2 is actuated by rotating the motor 10 in the forward direction, and the rotation of the motor 10 is stopped at a position where a desired parking brake force can be generated by the EPB 2. Then, this state is maintained. By doing this, the desired parking brake force is generated. In the release control, the EPB 2 is actuated by rotating the motor 10 in the reverse direction, and the parking brake force generated by the EPB 2 is released.

Then, in the present embodiment, the EPB 2 is further used to inhibit the vehicle from sliding downward when an engine stall occurs on a slope. Hereinafter, EPB control processing that is performed by the vehicle brake system according to the present embodiment will be explained in detail. However, before doing so, operations of the EPB 2 for inhibiting the vehicle from sliding downward when an engine stall occurs on a slope will be explained.

Figure 3:
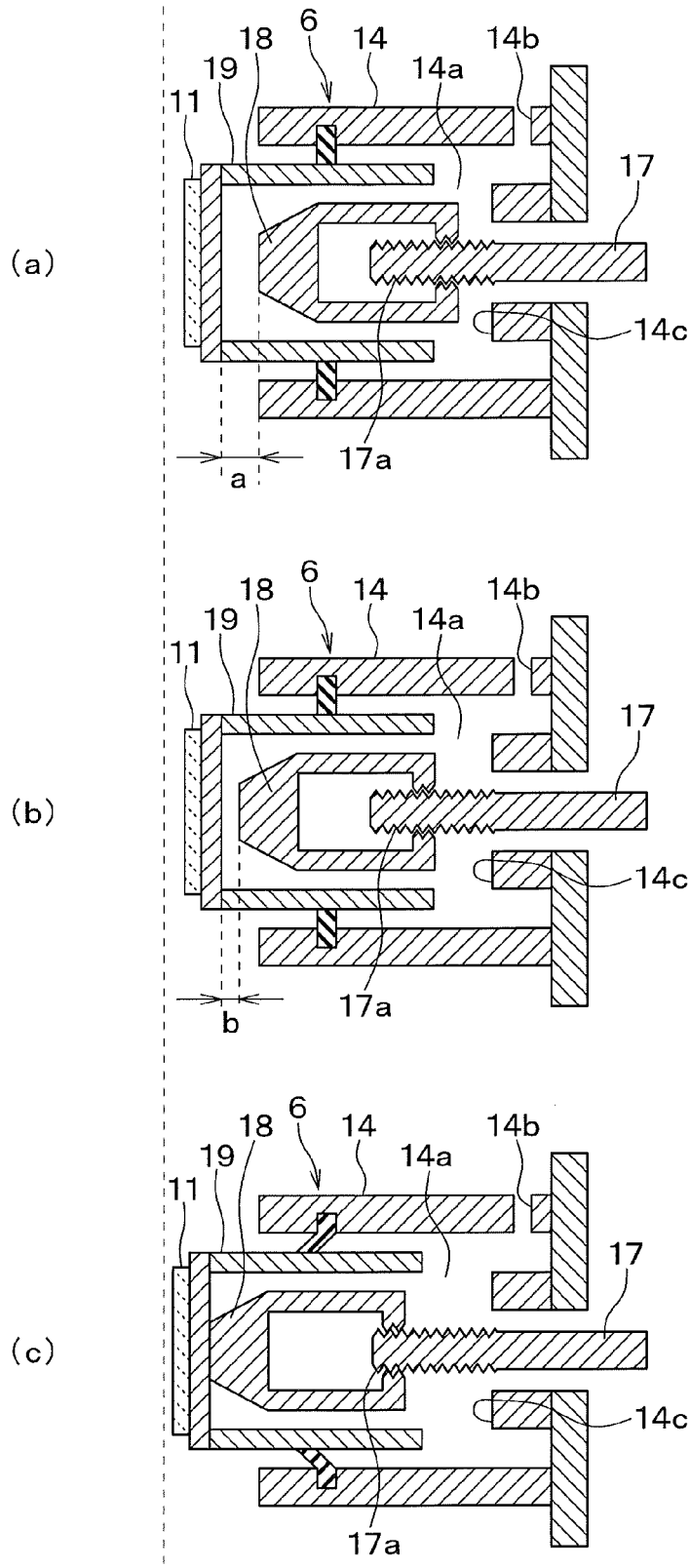
FIG. 3(a)-FIG. 3(c) are a simplified cross-sectional schematic diagram of the rear wheel brake mechanism showing operations for inhibiting the vehicle from sliding downward at the time of an engine stall on a slope.

In order to inhibit the vehicle from sliding downward when an engine stall occurs on a slope, rather than having the EPB 2 stand by in the normal released state (the released position) as in prior art, it is necessary to have the EPB stand by so as to be able to generate the parking brake force more quickly when the engine stall is detected. Thus, in order to cause the EPB 2 to generate the parking brake force more quickly, a standby position of the EPB 2, more specifically, the standby position of the propeller shaft 18 may be used as a standby state (hereinafter referred to as an accelerator release standby state) for inhibiting the vehicle from sliding downward when an engine stall occurs. FIG. 3 is a simplified cross-sectional schematic diagram of the rear wheel brake mechanism showing the operations for inhibiting the vehicle from sliding downward when an engine stall occurs on a slope. With reference to the diagram, the standby position of the EPB 2 in the accelerator release standby state will be explained.

FIG. 3(a) shows the normal released state, for example, a state when the service braking force is generated by the service brake 1 and thereafter the service braking force is released, or a state when the parking brake force is generated by the EPB 2 and thereafter the parking brake force is released. In this state, the propeller shaft 18 is put into the released position and positioned in the standby position in which a clearance between the leading end of the propeller shaft 18 and a bottom portion of the piston 19, namely, a clearance between respective pressing surfaces of the propeller shaft 18 and the piston 19, is maintained to be a clearance a, which is a clearance in the normal released state.

In contrast to this, when the vehicle may slide downward on a slope, the motor 10 is driven, and thereby, the propeller shaft 18 is moved in advance to the standby position that inhibits the vehicle from sliding downward at the time of the engine stall. The propeller shaft 18 is moved in advance in a direction approaching a locked position from the released position. At that time, as shown in FIG. 3(*b*), as the accelerator release standby state, a standby state can be obtained in which the clearance between the leading end of the propeller shaft 18 and the bottom portion of the piston 19 becomes a clearance b for inhibiting the vehicle from sliding downward, the clearance b being smaller than the clearance a in the released position. Further, as shown in FIG. 3(*c*), the standby position may be a state in which the leading end of the propeller shaft 18 abuts against the bottom portion of the piston 19 and the piston 19 and the brake pads 11 may be slightly pushed out toward the brake disc 12 side.

As shown in FIG. 3(*b*), in the case of the clearance b, the leading end of the propeller shaft 18 is positioned closer to the bottom portion of the piston 19. As a result, the responsiveness of the EPB 2 can be improved, and the parking brake force can be generated by the EPB 2 more quickly. Therefore, it becomes possible to reduce an amount by which the vehicle slides downward and inhibit the vehicle from sliding downward.

Further, as shown in FIG. 3(*c*), when the propeller shaft 18 is in contact with the piston 19 and the piston 19 is moved from an initial positon thereof so as to cause a state in which the brake pads 11 are slightly pushed out toward the brake disc 12 side, not only the responsiveness of the EPB 2 can be improved, but also the responsiveness of the service brake 1 can be improved, when the driver notices the vehicle siding downward and suddenly operates the service brake 1. In other words, as the brake pads 11 are already in a state of being closer to the brake disc 12 when the service brake 1 is operated, the service braking force can be generated more quickly.

However, in the state shown in FIG. 3(*c*), as the clearance between the brake pads 11 and the brake disc 12 is narrowed, there is a possibility that the brake pad 11 and the brake disc 12 come into contact with each other. In that case, there is a possibility that a dragging feeling of a brake is felt by the driver or a brake noise is generated. Therefore, depending on whether importance is placed on improving the responsiveness of the service brake 1 or on inhibiting the dragging feeling of the brake, the brake noise or the like, either of the form in FIG. 3(*b*) or FIG. 3(*c*) may be selected appropriately. In the case of the present embodiment, as described below, the standby position is selected according to the inclination of the road surface, while having the position of FIG. 3(*b*) as a first standby position and the position of the FIG. 3(*c*) as a second standby state.

Next, the EPB control processing that is performed by the EPB-ECU 9 in the vehicle brake system according to the present embodiment will be explained in detail with reference to FIG. 4 to FIG. 16.

Figure 4:
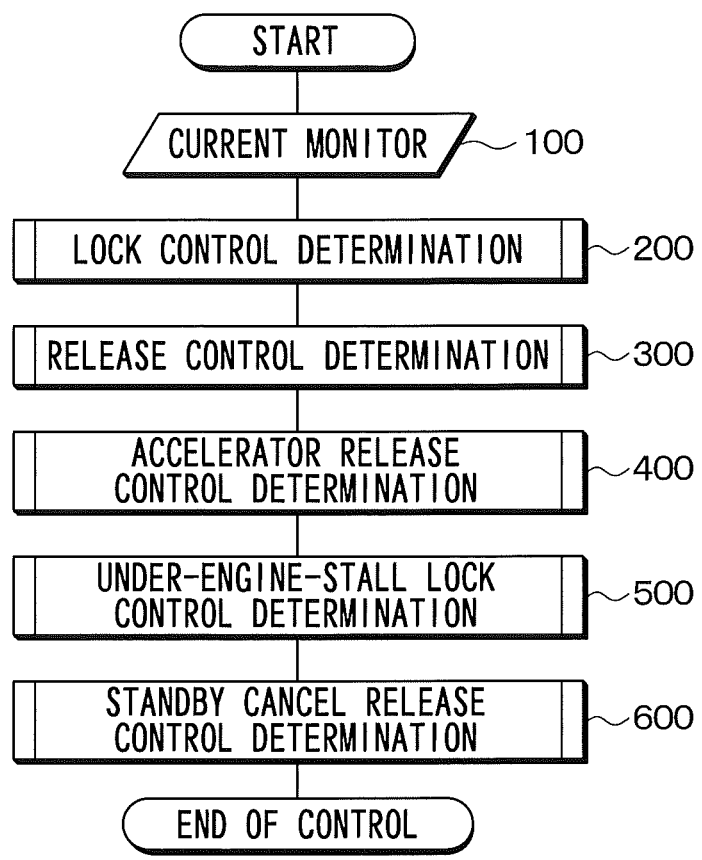
FIG. 4 is a flowchart showing overall EPB control processing.

FIG. 4 is a flowchart showing the overall EPB control processing. The processing shown in FIG. 4 is performed at a predetermined control cycle during a period in which an ignition switch is turned on, for example, and is continuously performed even when an engine stall occurs.

Current monitor processing is performed at step 100. More specifically, a motor current value is detected. Then, based on the motor current value (hereinafter referred to as a current monitor value) detected by the current monitor processing, lock control determination processing at step 200, release control determination processing at step 300, accelerator release control determination processing at step 400, under-engine-stall lock control determination processing at step 500, and standby cancel release control determination processing at step 600 are performed.

Figure 5:
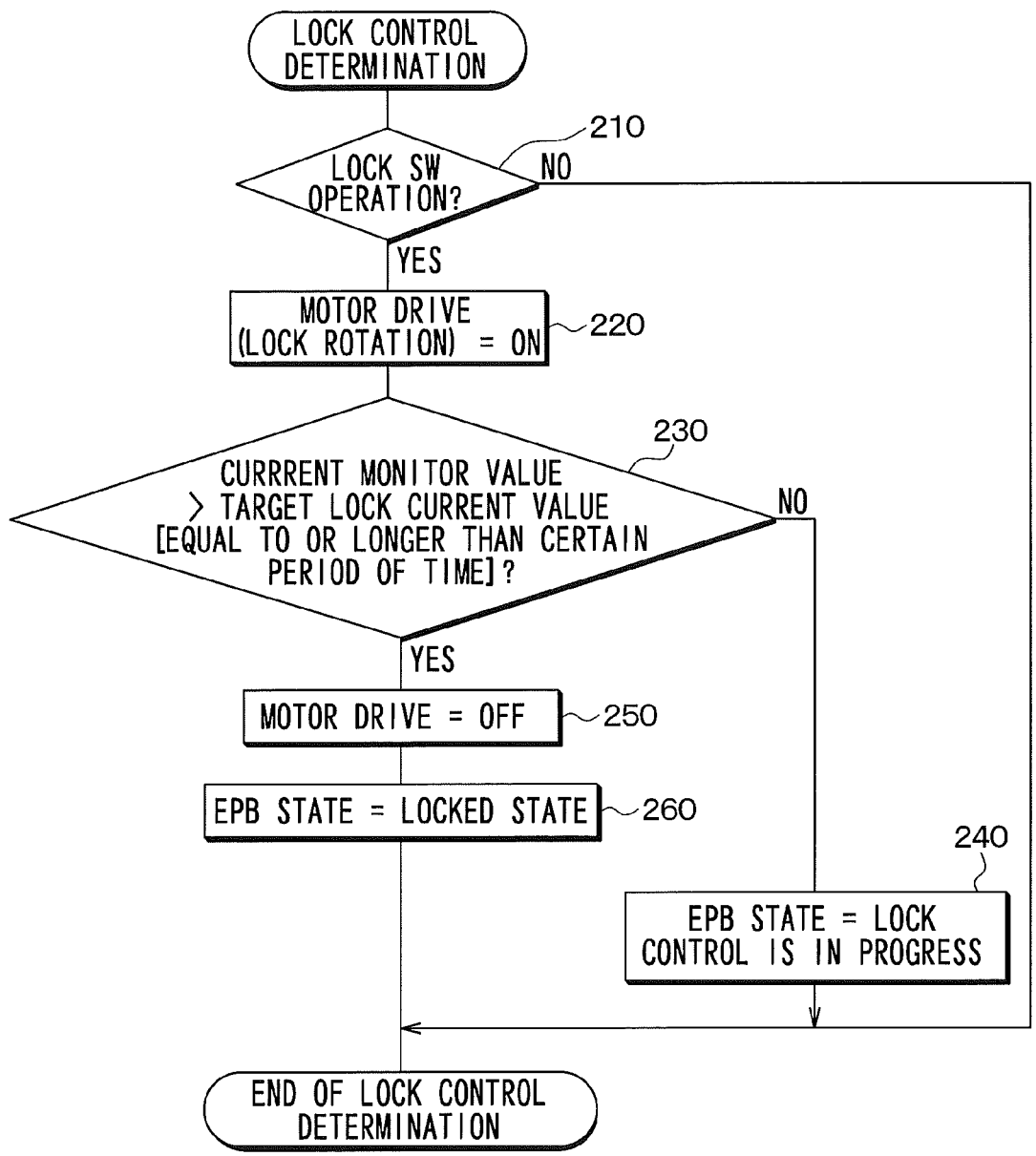
FIG. 5 is a flowchart showing details of lock control determination processing.

FIG. 5 is a flowchart showing details of the lock control determination processing shown at step 200 in FIG. 4. In the processing, the lock control is performed for putting the wheel into the locked state when the driver performs a lock operation.

First, at step 210, it is determined whether or not a SW operation for performing the lock control has been performed. The determination is made based on a signal that indicates an operation state of the operation SW 23. An on state of the operation SW 23 means that the driver is trying to cause the EPB 2 to be actuated and to be put into the locked state by the lock control. An off state of the operation SW 23 means that the driver is trying to cause the EPB 2 to be put into the released state by the release control. Therefore, it is determined that the SW operation for performing the lock control has been performed based on whether the operation SW 23 is switched from the off state to the on state. At this step, when a negative determination is made, the processing is terminated straight away, and when a positive determination is made, the processing advances to step 220.

At step 220, a motor drive is turned on and the motor 10 is rotated in a positive direction, namely, in a direction that puts the wheel into the locked state. Along with the positive rotation of the motor 10, the spur gear 15 is driven and the spur gear 16 and the rotation shaft 17 are rotated. Then, the meshing between the male screw groove 17*a* and the female screw groove 18*a* causes the propeller shaft 18 to be moved to the brake disc 12 side. Along with that, the piston 19 is also caused to be moved in the same direction, thereby causing the brake pads 11 to be moved to the brake disc 12 side.

Then, the processing advances to step 230, and, provided that a certain period of time has passed, it is determined whether or not the current monitor value of the present control cycle exceeds a target lock current value. The motor current (the current monitor value) changes in accordance with the load applied to the motor 10. In the case of the present embodiment, the load applied to the motor 10 corresponds to a pressing force that presses the brake pads 11 against the brake disc 12. Thus, the motor current has a value that corresponds to the pressing force that is generated by the motor current. Therefore, as long as the motor current exceeds the target lock current value, a state is obtained, by the generated pressing force, in which a desired parking brake force is generated. In other words, a state is obtained in which the EPB 2 causes friction surfaces of the brake pads 11 to be pressed against an inner wall surface of the disc brake 12 by a certain amount of force. Therefore, based on whether or not the current monitor value has exceeded the target lock current value, it is possible to detect that the desired parking brake force has been generated.

Note that the certain period of time is set to a period that is equal to or longer than a period which is assumed to be required for a rush current, which may be generated at the time of staring the lock control, to settle and that is shorter than a minimum time that is assumed to be required for the lock control to be performed. For example, at the same time as the motor drive is turned on, a counting-up of a lock control time counter, which is not shown in the drawings, is started. It is determined that the certain period of time has passed when the counter has reached a number of counts that corresponds to the certain period of time. This inhibits occurrence of a situation in which a positive determination is made mistakenly at this step when the rush current exceeds the target lock current value.

Until the positive determination is made at step 230, the processing advances to step 240 and indicates that the EPB state is a state in which the lock control is in progress, by setting a lock control in progress flag, for example. The processing is then ended, and the processing at step 230 is repeated. Then, when the positive determination is made at step 230, the processing advances to step 250, and after the motor drive is turned off, the processing advances to step 260 at which it is indicated that the EPB state is the locked state by resetting the lock control in progress flag and setting a locked state flag, for example. In this manner, the lock control determination processing is completed. Note that a position of the propeller shaft 18, which is put into the locked state by the lock control in this manner, is defined as the locked position.

Figure 6:
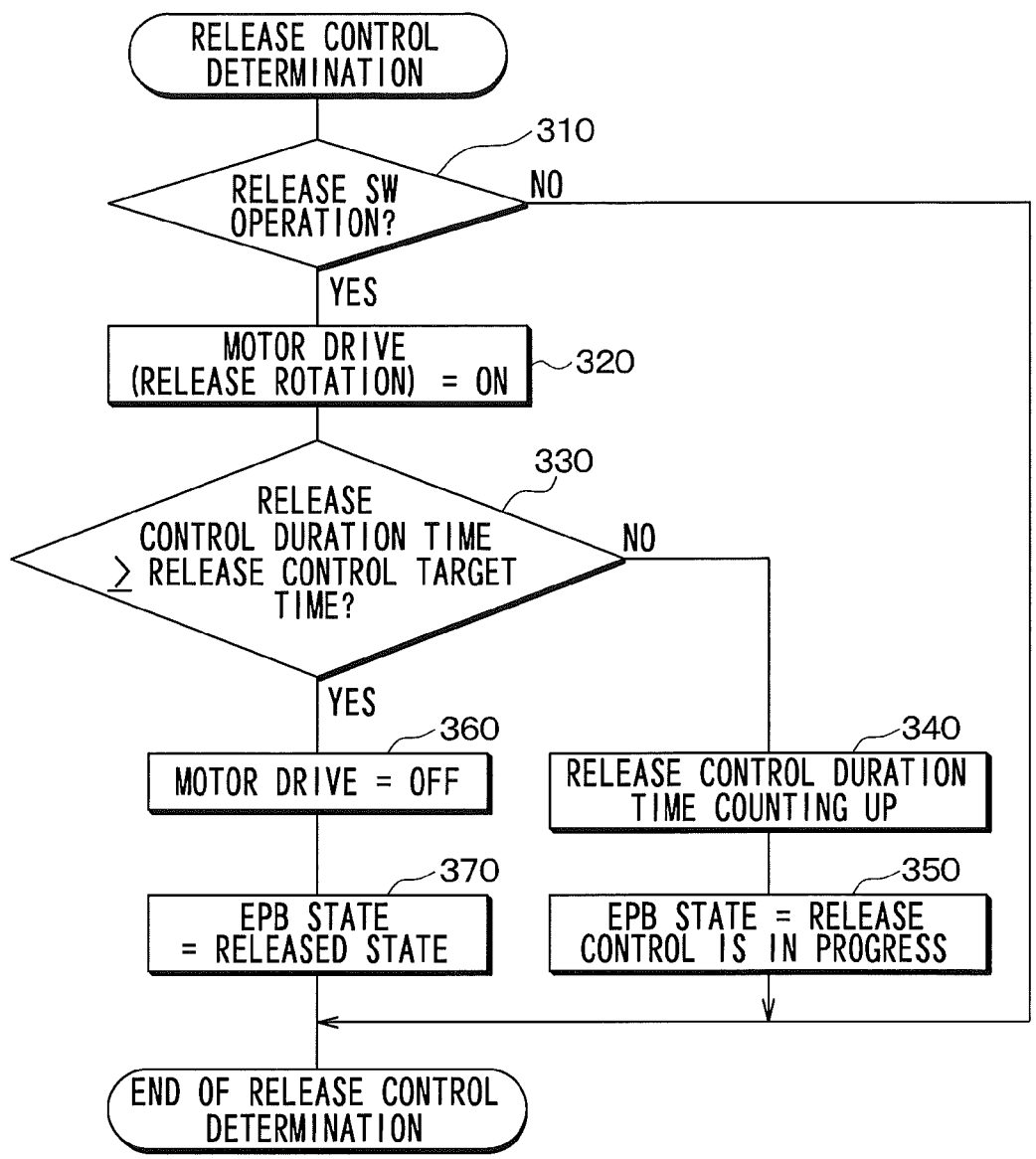
FIG. 6 is a flowchart showing details of release control determination processing.

FIG. 6 is a flowchart showing details of the release control determination processing shown at step 300 in FIG. 4. In the processing, the release control is performed for putting the wheels into the released state when the driver performs a release operation.

First, at step 310, it is determined whether or not the SW operation for performing the release control has been performed. The determination is made based on the signal that indicates the operation state of the operation SW 23. As described above, the off state of the operation SW 23 means that the driver is trying to put the EPB 2 into the released state by the release control. Thus, it is determined that the SW operation for performing the release control has been performed based on whether the operation SW 23 is switched from the on state to the off state. At this step, when a negative determination is made, the processing is terminated straight away, and when a positive determination is made, the processing advances to step 320. Further, at this time, it is indicated that the EPB state is no longer the locked state by resetting the lock state flag shown in FIG. 5.

At step 320, the motor drive is turned on and the motor 10 is rotated in a reverse direction, namely, in a direction that puts the wheel into the released state. Along with the reverse rotation of the motor 10, the spur gear 15 is driven and the spur gear 16 and the rotation shaft 17 are rotated. Then, the meshing between the male screw groove 17a and the female screw groove 18a causes the propeller shaft 18 to be moved in a separating direction with respect to the disc brake 12. Along with that, the piston 19 is also moved in the same direction, thereby causing the brake pads 11 to be separated from the brake disc 12.

Then, the processing advances to step 330, and it is determined whether or not a release control duration time has exceeded a release control target time. The release control duration time is an elapsed time from when the release control is started. For example, when the motor drive is turned on at step 320, a counting-up of a release control duration time counter, which is not shown in the drawings, is started at step 340, which will be described below. Then, when the counter reaches a number of counts that corresponds to the release control target time, it is determined that the release control duration time has become equal to or longer than the release control target time. Further, the release control target time is a time that is assumed to be required to move the propeller shaft 18 from the locked position, which is caused by the above-described lock control processing to put the wheel in the locked state, to the released position, in which the wheel is in the normal released state, namely, to the standby position, in which the clearance a is maintained between the leading end of the propeller shaft 18 and the bottom portion of the piston 19, as shown in FIG. 3(a). The release control target time is set based on a movement amount of the propeller shaft 18 corresponding to a rotation speed of the motor 10, etc.

Then, until the positive determination is made at step 330, the processing advances to step 340 at which the counting-up of the release control duration time counter is performed. After that, the processing advances to step 350, and indicates that the EPB state is a state in which the release control is in progress, by setting a release control in progress flag, for example. The processing is then ended and the processing at step 330 is repeated. On the other hand, when the positive determination is made at step 330, the processing advances to step 360 at which the motor drive is turned off. After that, the processing advances to step 370, and thereat, it is indicated that the EPB state is the released state by resetting the release control in progress flag and setting a released state flag, for example. In this manner, the release control determination processing is completed.

Note that the released state flag is caused to be reset when the locked state is obtained. The released state flag is reset at the same time as the EPB state is put into the locked state at step 260 in FIG. 5 or at step 550e in FIG. 13, which will be described below.

Figure 7:
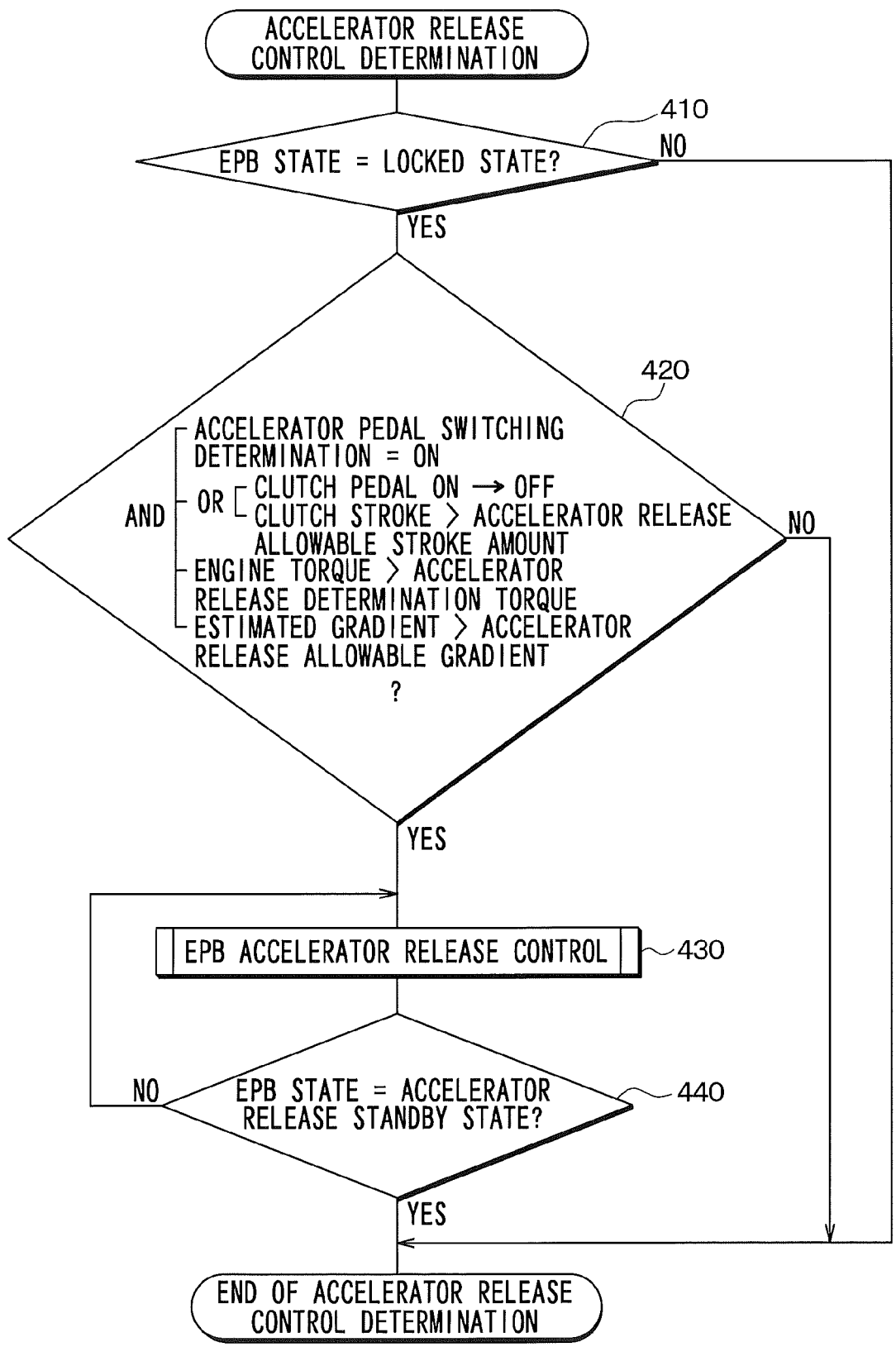
FIG. 7 is a flowchart showing details of accelerator release control determination processing.

FIG. 7 is a flowchart showing details of the accelerator release control determination processing shown at step 400 in FIG. 4. In the processing, it is determined whether or not conditions for putting the EPB 2 into the accelerator release standby state are satisfied. When the conditions are satisfied, an accelerator release control is performed for inhibiting the vehicle from sliding downward when an engine stall occurs on a slope.

First, at step 410, it is determined whether or not the EPB state is the locked state. By this, it is determined whether or not a situation exists in which the driver is starting the vehicle after performing the lock operation while the vehicle is stopped on a slope, and also, whether or not a situation exists in which the EPB 2 is automatically put into the locked state by a slope holding control. The slope holding control is a control that automatically causes the EPB 2 to generate the parking brake force, not only when the diver performs the lock operation, but also when the vehicle is stopped on a road surface having an inclination equal to or greater than a predetermined inclination, to inhibit the vehicle from sliding downward on the slope. In this case, the EPB 2 also causes the wheels to be in the locked state. In those cases, if the propeller shaft 18 is returned to the released position when the vehicle is started, the sliding downward of the vehicle becomes larger at the time of an engine stall on a slope. Therefore, when a negative determination is made at this step, it is determined that it is not necessary to perform the accelerator release control, and the processing is terminated. Whereas, when a positive determination is made, the processing advances to step 420.

At step 420, it is determined whether or not performance conditions for the accelerator release control are satisfied. A situation in which the accelerator release control should be performed is a situation in which there is a possibility that an engine stall occurs on a slope that may cause the vehicle to slide downward. This type of situation is considered as the performance conditions for the accelerator release control. Here, the performance conditions are that an accelerator pedal switching determination is turned on, the driver is trying to engage the clutch, the driver has started depressing the accelerator pedal, and the vehicle is on a slope that may cause the vehicle to slide downward.

In the accelerator pedal switching determination, it is determined whether or not switching from the brake pedal to the accelerator pedal has taken place. When the switching of the pedals takes place, the accelerator pedal switching determination changes from an off to an on determination. It is possible to make the determination by receiving data relating to an accelerator opening degree or an engine rotation speed, which are handled by the engine ECU 28, for example. The on determination is made in the accelerator pedal switching determination when the accelerator opening degree increases from that of an idling state, or when the engine rotation speed increases from an idling engine rotation speed.

It is determined whether or not the driver is trying to engage the clutch based on whether a clutch pedal is switched from on to off or whether a clutch stroke exceeds an accelerator release allowable stroke amount, which is set in advance. The on/off of the clutch pedal can be determined based on the detection signal from the pedal stroke sensor 26, which detects a depression of the clutch pedal. The clutch stroke can be also determined based on the detection signal from the pedal stroke sensor 26. The clutch stroke indicates an amount of relaxation in the depression of the clutch pedal. A state in which the clutch pedal is depressed to the maximum amount is set as 0. Further, the accelerator release allowable stroke amount is set to a position at which the driver is trying to engage the clutch, for example, to a clutch stroke that corresponds to a half-clutch position.

It is determined whether or not the driver has started depressing the accelerator based on whether or not the engine torque exceeds an accelerator release determination torque. The accelerator release determination torque is set to an engine torque at which it is assumed that the accelerator has been depressed. The engine torque is handled by the engine ECU 28. Thus, the determination can be made by receiving data relating to the engine torque from the engine ECU 28.

Note that the clutch engagement determination and the above-described acceleration pedal switching determination are performed because the depression of the accelerator is a condition for releasing the locked state of the EPB 2 to start the vehicle. However, as those determinations are performed redundantly, the determinations do not necessarily have to be performed or only one of the determinations may be performed.

The inclination of the road surface on which the vehicle is stopped can be estimated based on the detection signal from the front-rear G sensor 25. Thus, it is determined whether or not a slope may cause the vehicle to slide downward by determining whether or not the estimated inclination exceeds an accelerator release allowable gradient. The accelerator release allowable gradient is a value that is set in advance as a gradient at which it is assumed that the vehicle may slide downward. However, situations that cause the vehicle to slide downward when the vehicle is started include not only the case when the vehicle is operated to move forward uphill, i.e., while facing an uphill road, but also the case when the vehicle is operated to move backward uphill, i.e., while facing a downhill road. Therefore, the accelerator release allowable gradient is set to a gradient corresponding to the vehicle facing an uphill road (a positive gradient, for example) in a state in which the shift is put into a forward-moving gear, such as the first speed gear or the second speed gear, namely, a state in which the shift is not put into the reverse (R) gear or in another state in which the shift is not put into any gear. Whereas, in a state in which the shift is put into the reverse (R) gear, the accelerator release allowable gradient is set to a gradient corresponding to the vehicle facing a downhill road (a negative gradient, for example).

Figure 10:
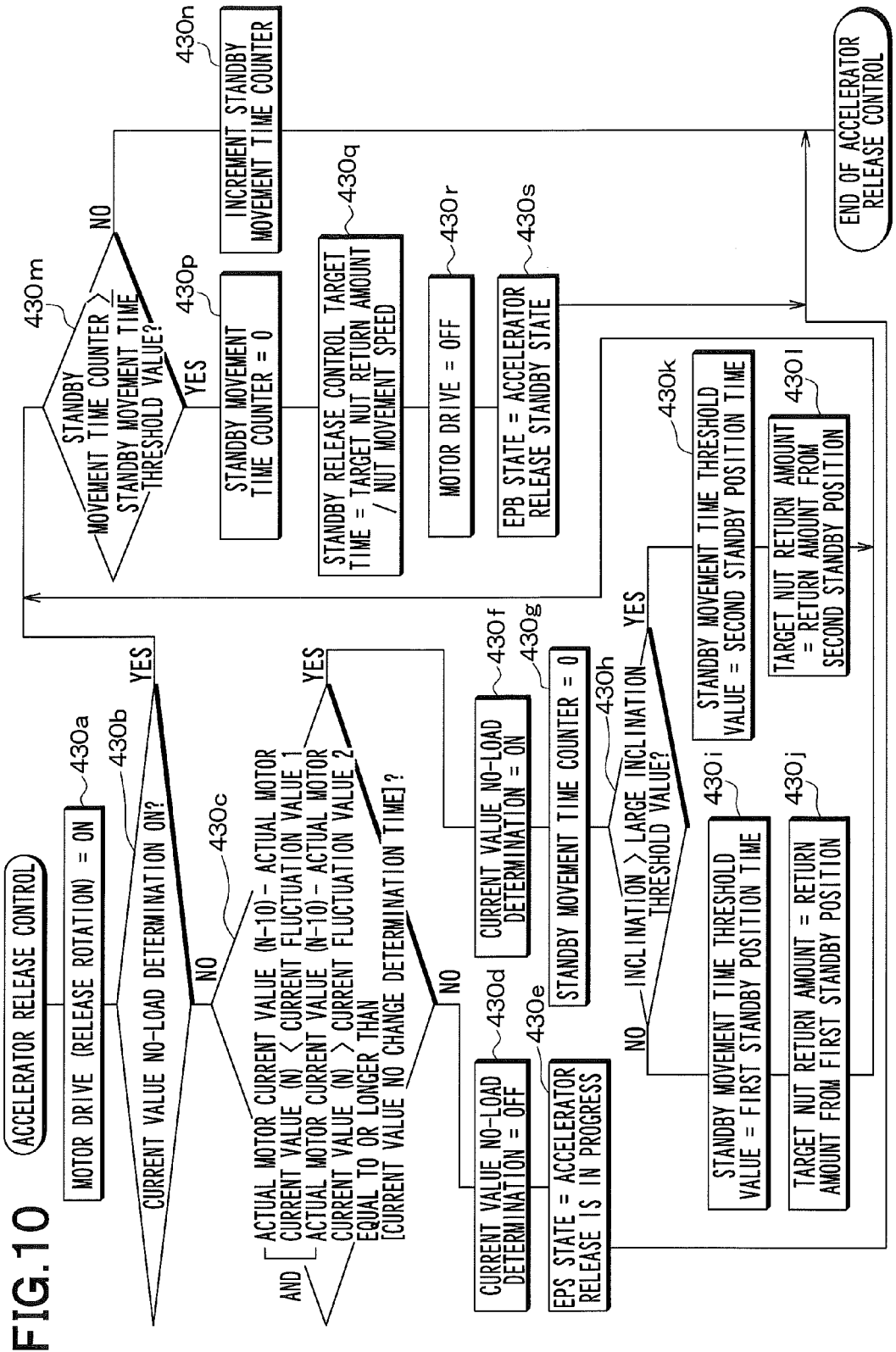
FIG. 10 is a flowchart showing details of accelerator release control processing.

When such performance conditions for the accelerator release control are satisfied, the processing advances to step 430, and thereat, accelerator release control processing is performed by the EPB 2. FIG. 10 is a flowchart showing details of the accelerator release control processing.

First, at step 430*a*, the motor drive is turned on. More specifically, the motor 10 is caused to rotate in the reverse direction, which causes the wheel to be put into the released state. Along with the reverse rotation of the motor 10, the spur gear 15 is driven and the spur gear 16 and the rotation shaft 17 are rotated. Then, the meshing between the male screw groove 17*a* and the female screw groove 18*a* causes the propeller shaft 18 to be moved in the separating direction with respect to the disc brake 12. Along with that, the piston 19 is also caused to be moved in the same direction, thereby causing the brake pads 11 to be separated from the brake disc 12.

Then, the processing advances to step 430*b*, and it is determined whether or not a current value no-load determination is on. The current value no-load determination is a determination that is made at the next step 430*c*. The current value no-load determination determines whether or not the current monitor value has become a current value that is obtained when the motor 10 is put into a no-load state. When the motor drive is initially started at step 430*a*, as the current no-load determination is not yet on, a negative determination is made at step 430*b* at first.

After that, the processing advances to step 430*c*, and the current no-load determination is performed. Here, it is determined whether or not a state in which the current value does not change lasts for a period of time equal to or longer than a current value no change determination time. More specifically, when the motor 10 is put into the no-load state, the current monitor value becomes the no-load current value and is constant. Thus, when this state lasts for a predetermined period of time, it is determined that the no-load state is obtained. However, the current monitor value, namely, a motor current raw value fluctuates due to some variations that are caused by noise and the like. Therefore, the present embodiment is made to determine whether a state is obtained in which a difference between the actual motor current value of a predetermined preceding cycle (n−10) (For example, obtained at a cycle that precedes the present cycle by 10 cycles) and the actual motor current value in the present control cycle (n) is smaller than a current fluctuation value 1 corresponding to a first no-load current determination current value and greater than a current fluctuation value 2 corresponding to a second no-load current determination current value.

Figure 11:
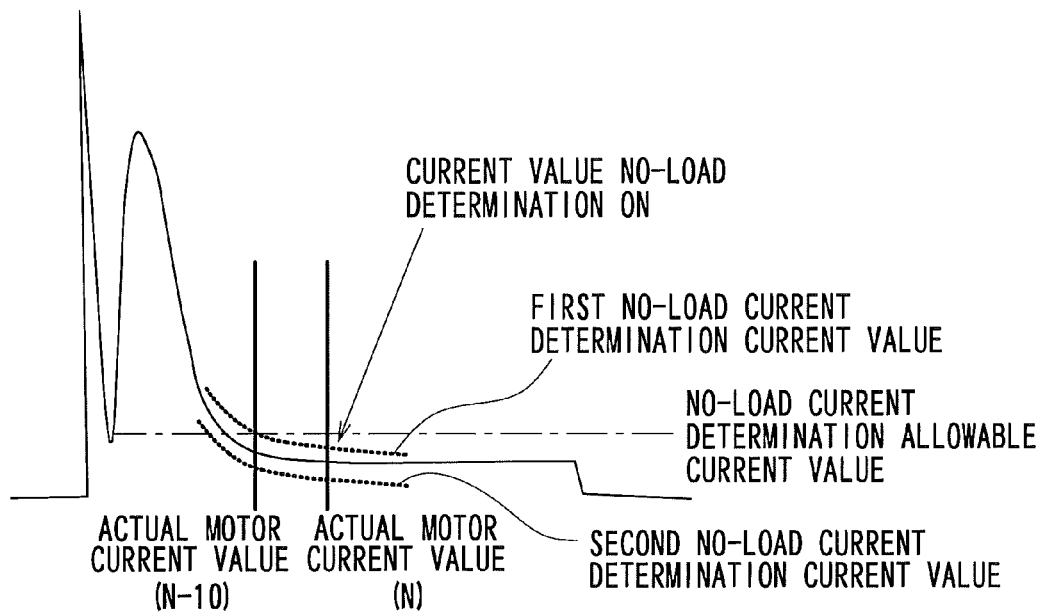
FIG. 11 is a diagram showing an image of changes in a motor current and a no-load current determination.

FIG. 11 is a diagram showing an image of changes in the motor current and the no-load current determination. As shown in the diagram, it is determined that the no-load current value is obtained when the difference between the actual motor current value in the present control cycle (n) and the actual motor current value of the predetermined preceding cycle (n–10) is between the first and second no-load current determination current values (the current fluctuation values 1 and 2). Note that it can be erroneously determined that the no-load current is obtained even when the clearance between the brake pads 11 and the brake disc 12 is barely secured. It is possible to reduce the risk of having the erroneous determination by causing the determination to be made only when the current value is equal to or smaller than an allowable current value for the no-load current determination.

Therefore, until a positive determination is made at step 430*c*, the processing advances to step 430*d*. After the current value no-load determination is turned off, the processing advances to step 430*e*. Then, the processing is terminated while indicating that the accelerator release control is in progress by setting an accelerator release control in progress flag, for example. Then, when the positive determination is made at step 430*c*, the processing advances to step 430*f*, and the current value no-load determination is turned on.

Further, the processing advances to step 430*g*, and a standby movement time counter is set to 0. The standby movement time counter counts a time required for the EPB 2 to move to a desired standby position. Here, the standby movement time counter counts a standby movement time from the current no-load determination, which is made at the instant when the brake pads 11 are separated from the brake disc 12, to a point in time at which the EPB 2 reaches the standby position. The standby movement time is a value that is determined in accordance with the standby position and has different values for a first standby position and a second standby position. Here, as the standby position is not yet decided, the standby movement time counter is set to 0.

Next, the processing advances to step 430*h*, and it is determined whether or not the inclination of the road surface on which the vehicle is stopped exceeds a large inclination threshold value. As the inclination of the road surface, the estimated inclination is used that is obtained based on the detection signal from the front-rear G sensor 25. Further, the large inclination threshold value is a determination threshold value, which is used for setting the standby position, and indicates that the present inclination is relatively large when the inclination exceeds the large inclination threshold value. When the inclination is equal to or smaller than the large inclination threshold value, the present inclination is relatively small. Therefore, when a negative determination is made at step 430*h* so as to obtain the standby positon corresponding to the inclination of the road surface, the processing advances to step 430*i*, and a standby movement time threshold value is set to a first standby position time, namely, to a standby movement time that is required to make the first standby position as the standby position of the EPB 2. Further, the processing advances to step 430*j*, and a target nut return amount, which is an amount required to return the propeller shaft 18 (a nut) to the released position after the accelerator release control, is set to a return amount required from the first standby position. Further, when a positive determination is made at step 430*h*, the processing advances to step 430*k*, and the standby movement time threshold value is set to a second standby position time, namely, a standby movement time that is required to cause the standby position of the EPB 2 to be the second standby position. Further, the processing advances to step 430*l*, and the target nut return amount is set to a return amount required from the second standby position.

When the standby movement time threshold value is set in this manner, the processing advances to step 430*m*, and it is determined whether or not the standby movement time counter has reached a count value corresponding to the standby movement time threshold value that is set at steps 430*i* and 430*k*, namely, whether or not the propeller shaft 18 has reached the first standby position or the second standby position. Until a positive determination is made here, as the propeller shaft 18 has not yet reached the first standby position or the second standby position, the processing advances to step 430*n*, and after the standby movement time counter is incremented, the processing is terminated. In this case, the positive determination is made at step 430*b* in the next and following control cycles. Thus, the processing at step 430*m* is performed repeatedly, and a counting-up of the standby movement time counter is continued until the propeller shaft 18 reaches the first standby position or the second standby position. After that, when a positive determination is made at step 430*m* and the propeller shaft 18 reaches the first standby position or the second standby position, the processing advances to step 430*p* onward.

Then, after setting the standby movement time counter to 0 at step 430*p*, the processing advances to step 430*q*, and a standby cancel release control target time is set. The standby cancel release control time is a time required to cause the nut to return to the released position from the first standby position or the second standby position at the time of the standby cancel release control and is calculated based on the target nut return amount/a nut movement speed. The target nut return amount is a value that is set at the above-described steps 430*j* and 430*l*. The nut movement speed is a movement speed of the propeller shaft 18 in accordance with the rotation of the motor 10, and is calculated by multiplying a pitch of the female screw groove 18*a*, which is formed in the propeller shaft 18, by a rotation speed of the motor 10 at the time of no-load. The rotation speed of the motor 10 at the time of no-load can be a fixed value or can be determined based on characteristics of a voltage applied to the motor 10 and a rotation frequency thereof. After that, the processing advances to step 430*r*, and the motor drive is turned off. Further, the processing advances to step 430*s*, and the EPB state is put into the accelerator release standby state by setting an accelerator release standby state flag, for example. At the same time, a counting is started of a time elapsed from the start of the accelerator release standby state, and the processing is then terminated.

When the accelerator release control processing is terminated in this manner, the processing advances to step 440 in FIG. 7, and it is determined whether or not the EPB state is the accelerator release standby state. The determination is made based on whether or not the accelerator release standby flag is set, which is set at the above-described step 430*s* in FIG. 10. Then, until the accelerator release standby state is obtained, the accelerator release control is continued. When the accelerator release standby state is obtained, the accelerator release control determination processing is terminated.

Figure 8:
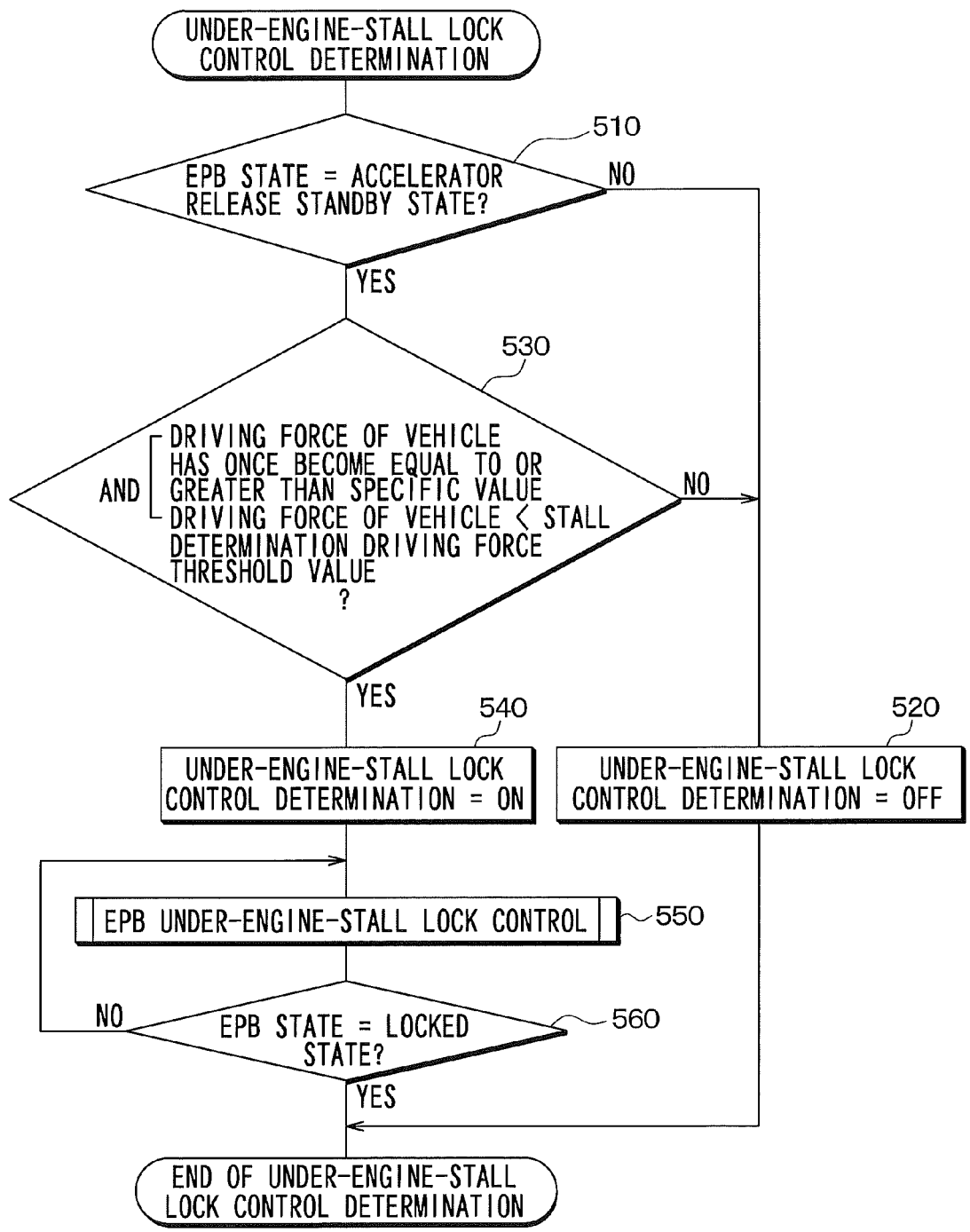
FIG. 8 is a flowchart showing details of under-engine-stall lock control determination processing.

FIG. 8 is a flowchart showing details of the under-engine-stall lock control determination processing shown at step 500 in FIG. 4. In this processing, an impossible-to-start state is detected in which the vehicle cannot start traveling and an engine stall hence occurs. Then, an under-engine-stall lock control is performed in which EPB 2 is caused to put the wheels into the locked state at the time of the engine stall.

First, at step 510, it is determined whether or not the EPB state is the accelerator release standby state. The determination is made by the same method as described above at step 440 in FIG. 7. When a negative determination is made here, it is not necessary to perform the under-engine-stall lock control. Thus, the processing advances to step 520, and after the under-engine-stall lock control determination is turned off, the processing is terminated straight away. Whereas, when a positive determination is made, the processing advances to step 530.

At step 530, it is determined whether or not the driving force of the vehicle has once reached or exceeded a specified value and whether the driving force is less than a stall determination drive threshold value. In other words, it is determined whether or not the impossible-to-start state is obtained as the driving force is small and only generated to an extent that could cause an engine stall.

Figure 12:
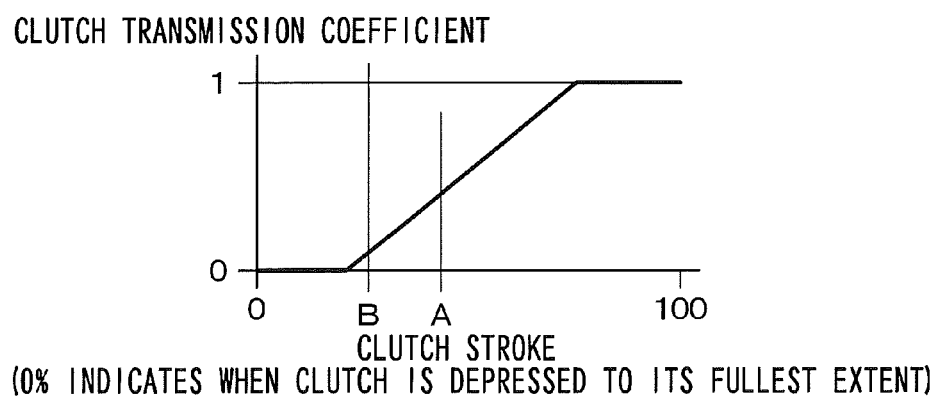
FIG. 12 is a diagram showing a relationship between a clutch stroke and a clutch transmission coefficient.

The driving force of the vehicle can be calculated based on a formula, which is: driving force of the vehicle=engine torque×clutch transmission coefficient, using a relationship between the clutch stroke and the clutch transmission coefficient, for example, the relationship being shown in FIG. 12. The stall determination drive threshold value is a value that determines that the driving force of the vehicle is only generated to an extent that could cause an engine stall, and is set at a lower limit value of the driving force which is required in order not to cause the engine stall. It may be acceptable to determine that the engine stall will occur in the case when the driving force of the vehicle is less than a stall determination driving force threshold value. However, in order not to make an erroneous determination to perform the engine stall time lock control while the engine stall is not occurring at an initial operational stage of starting the vehicle, it is confirmed that the driving force has once reached or exceeded a specific driving force. The specific value may be any value as long as it can be used to confirm that the driver has started an operation to try to engage the clutch.

When the positive determination is made at step 530 in this manner, the processing advances to step 540, and after the under-engine-stall lock control determination is turned on, the processing advances to step 550. Note that, although it is here determined whether the driving force of the vehicle has become equal to or greater than the specific value, it is also possible to inhibit the above-described erroneous determination by determining whether or not an operation time elapsed after an operation for starting the vehicle is started has reached or exceeded a specific period of time. Further, even after it is confirmed that the driver has started the operation to try to engage the clutch based on the clutch stroke, there is sometimes a case in which the clutch pedal is depressed again and the operation for starting the vehicle is discontinued. In this case, the impossible-to-start state is also obtained. Thus, even when the clutch stroke becomes equal to or less than a predetermined standard value, the processing may be caused to advance to step 540 to cause the under-engine-stall lock control to be turned on by determining that the vehicle is in the impossible-to-start state and the under-engine-stall lock control should be performed.

Figure 13:
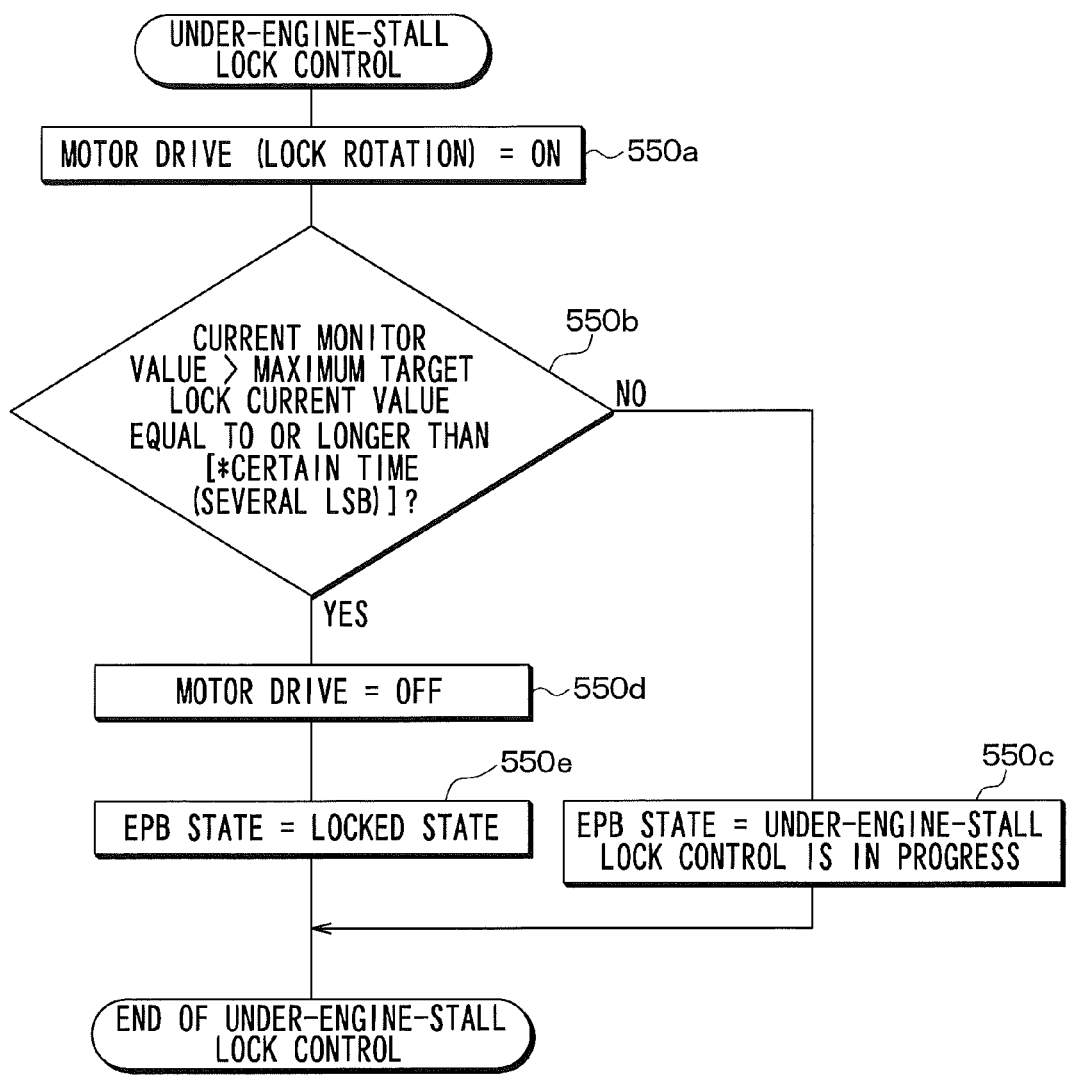
FIG. 13 is a flowchart showing details of an under-engine-stall lock control.

Then, the processing advances to step 550, and the under-engine-stall lock control is performed. FIG. 13 is a flowchart showing details of the under-engine-stall lock control. In the processing, in order to inhibit the vehicle from sliding downward when an engine stall occurs, the EPB 2 is caused to be actuated, thereby performing an operation for causing the wheels to be locked.

First, at step 550*a*, the motor drive is turned on. In other words, the motor 10 is caused to rotate in the forward direction, which causes the wheel to be put into the locked state. Along with the forward rotation of the motor 10, the spur gear 15 is driven and the spur gear 16 and the rotation shaft 17 are rotated. Then, the meshing between the male screw groove 17*a* and the female screw groove 18*a* causes the propeller shaft 18 to move to the disc brake 12 side. Along with that, the piston 19 is moved in the same direction, thereby causing the brake pads 11 to be moved to the brake disc 12 side. At this time, the accelerator release control causes the EPB 2 to be put into the accelerator release standby state, namely, causes the propeller shaft 18 to be in the first or the second standby position, as described above. Thus, it is possible to cause the propeller shaft 18 to be pressed against the piston 19 and the brake pads 11 as soon as the engine stall is detected, thereby generating the parking brake force more quickly.

After that, the processing advances to step 550*b*, and it is determined whether or not the current monitor value exceeds a maximum target lock current value. The determination may be made based on whether or not the current monitor value in the present control cycle exceeds the maximum target lock current value. However, in order to exclude a case in which the current monitor value becomes large due to noise, it is preferable to determine whether such a state continues for a certain period of time (for several control cycles). Further, the maximum target lock current value means a maximum value of the current that is allowed to be supplied to the motor 10 of the EPB 2 as a design value. Further, by supplying the current of the maximum value to the motor 10 in this manner, it is possible to cause a larger parking brake force to be generated. By doing so, it is possible to reliably stop the vehicle even when a situation arises that cannot be controlled by the driver, namely, when the sliding downward of the vehicle occurs. Further, it is possible to stop the vehicle even when the braking force weakens due to jolting of the vehicle. Note that, although the maximum target lock current value is used here, the value may be any value as long as the value is greater than a current value obtained in the normal locked state.

Here, until a positive determination is made at step 550*b*, the processing advances to step 550*c*, and indicates that the EPB state is in a state in which the under-engine-stall lock control is in progress by setting an under-engine-stall lock control in progress flag, for example. The processing is then ended. In this case, the under-engine-stall lock control is continued and the motor drive is turned on. Then, when the positive determination is made at step 550*b*, as it is assumed that a state is obtained in which a sufficiently large parking brake force is generated, the processing advances to step 550*d*, and the motor drive is turned off. After that, the processing advances to step 550*e*, and it is indicated that the EPB state is the locked state by resetting the under-engine-stall lock control in progress flag and setting a locked state flag, for example. In this manner, the under-engine-stall lock control processing is completed.

When the under-engine-stall lock control processing is terminated in this manner, the processing advances to step 560 in FIG. 8, and it is determined whether or not the EPB state is the locked state. The determination is made based on whether or not the locked state flag is set that is set at the above-described step 550*e* in FIG. 13. Then, until the locked state is obtained, the under-engine-stall lock control is continued, and when the locked state is obtained, the under-engine-stall lock control processing is terminated.

Figure 9:
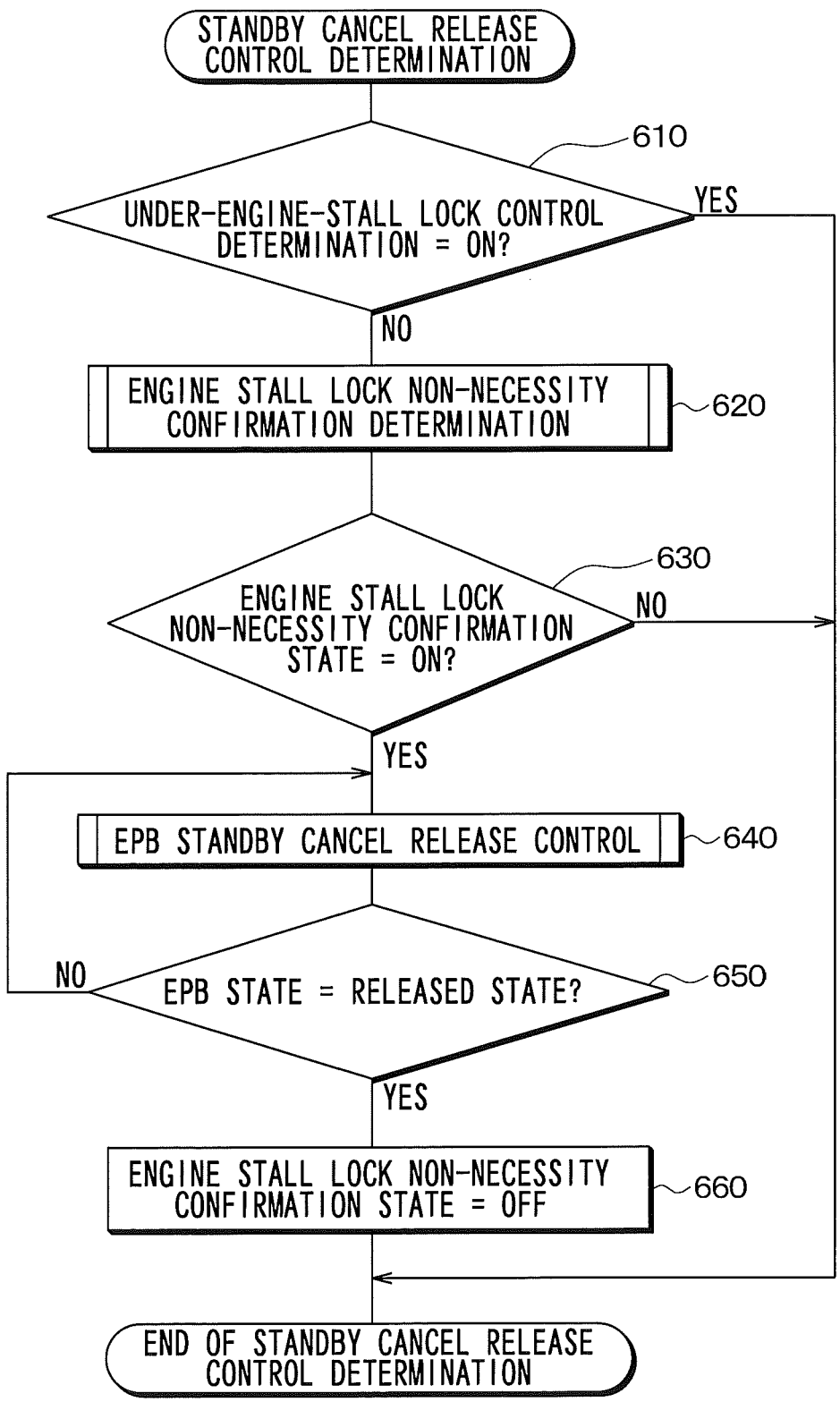
FIG. 9 is a flowchart showing details of standby cancel release control determination processing.

FIG. 9 is a flowchart showing details of the standby cancel release control determination processing shown at step 600 in FIG. 4. The processing detects a situation in which it is not necessary to perform the under-engine-stall lock control, for example, in the case of the normal start of the vehicle, namely, when the vehicle has started moving without an engine stall occurring after the vehicle is started. Further, the processing causes an EPB standby cancel release control to be performed that causes the standby position of the EPB 2 to return to the released position from the standby position for the under-engine-stall lock control.

First, at step 610, it is determined whether or not the under-engine-stall lock control determination is turned on. When the under-engine-stall lock control determination is turned on, the EPB standby cancel release control should not be performed yet. Thus, the processing advance to step 620, and engine stall lock non-necessity confirmation determination processing is performed.

Figure 14:
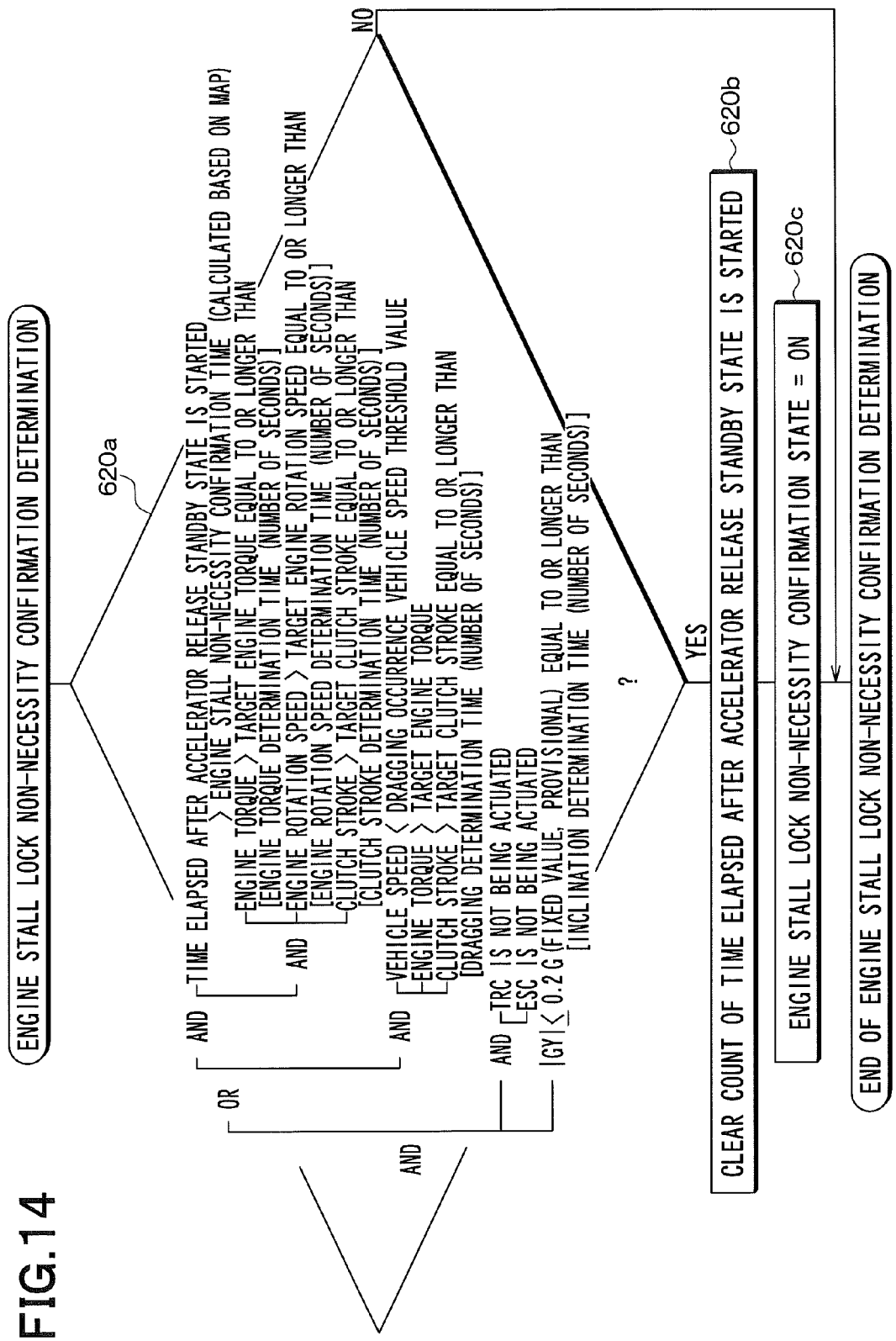
FIG. 14 is a flowchart showing details of engine stall lock non-necessity confirmation determination processing.

FIG. 14 is a flowchart showing details of the engine stall lock non-necessity confirmation determination processing. In the engine stall lock non-necessity confirmation determination processing, it is determined whether or not an engine stall lock non-necessity confirmation state is obtained after it is determined that it is no longer necessary to perform the under-engine-stall lock control and to maintain the standby position. When the engine stall lock non-necessity confirmation state is obtained, the under-engine-stall lock control is no longer performed after that. Thus, the accelerator release standby state may be released and moved back to the normal released state. In this type of case, if the accelerator release standby state is maintained, there is a risk that the dragging of the brake occurs, and then, noise, vibration, or overheating of the brake may be caused by the dragging of the brake after the vehicle is started. Thus, it is preferable to release the accelerator release standby state at an earlier stage by accurately determining that the engine stall lock non-necessity confirmation state is obtained.

More specifically, at step 620*a*, it is determined whether or not conditions are satisfied for the engine stall lock non-necessity confirmation state.

First, a first condition for determining the engine stall lock non-necessity confirmation state is a condition in which a state in which a vehicle speed exceeds a specific speed threshold value is required to be maintained for a period of time equal to or longer than a predetermined time threshold value. The first condition is set in accordance with the gradient (inclination) of the road surface. When the gradient is large, even when the vehicle has started moving, an engine stall may occur if the vehicle speed is not large. Therefore, as the gradient of the road surface becomes larger, at least one of the specific vehicle speed threshold value and the time threshold value is set to be larger.

Here, an engine stall non-necessity confirmation time is set as an indicator for indicating that the state in which the vehicle speed exceeds the specific speed threshold value has been maintained for the period of time equal to or longer than the predetermined time threshold value. Then, the first condition for determining the engine stall lock non-necessity determined state is set such that the above-described count value (refer to step 430*s* in FIG. 10) for counting the time elapsed after the accelerator release standby state is obtained exceeds the engine stall non-necessity confirmation time.

FIG. 15 is a map used for setting the engine stall non-necessity confirmation time. As shown in FIG. 15, the engine stall non-necessity confirmation time can be selected based on a relationship between the gradient of the road surface and the vehicle speed. More specifically, the engine stall non-necessity confirmation time is set to a longer value as the gradient becomes larger when the vehicle speed is constant. On the other hand, the engine stall non-necessity confirmation time is set to a shorter value as the vehicle speed becomes larger. In other words, it is less likely for the vehicle to have an engine stall when the road surface, on which the vehicle travels, is closer to a flat surface road or when the vehicle speed is larger. On the other hand, it is more likely for the vehicle to have an engine stall when the gradient of the road surface is larger or when the vehicle speed is smaller. Thus, the engine stall non-necessity confirmation time is set in accordance with the gradient of the road surface and the vehicle speed. There is a possibility that the gradient of the road surface or the vehicle speed, which is detected in each of the control cycles, changes. Thus, in the case of the present embodiment, the engine stall non-necessity confirmation time is updated every time after each of the control cycles.

Further, in the present embodiment, as the conditions for causing the engine stall lock non-necessity confirmation state, other conditions are also set as well as the first condition. The conditions other than the first condition, which are shown below, are not prerequisite conditions, but are adopted to make a determination more accurately when determining the engine stall lock non-necessity confirmation state.

More specifically, as second conditions, it is determined whether or not each of the following conditions is satisfied, namely, whether the engine torque exceeds a target engine torque, the engine rotation speed exceeds a target engine rotation speed, and the clutch stroke, which corresponds to an operation amount of the clutch, exceeds a target clutch stroke, which corresponds to a target operation amount of the clutch. The engine torque and the engine rotation speed are obtained by receiving data relating to the engine torque and the engine rotation speed, which are handled by the engine ECU 28. Further, the clutch stroke is also obtained based on the detection signal from the pedal stroke sensor 26. The target engine torque, the target engine rotation speed and the target clutch stroke are all set in advance based on experiments and the like.

When those conditions are satisfied, it is assumed that the driver has an intention to start the vehicle, namely, the driver is appropriately depressing the accelerator pedal and performing a clutch pedal operation to an extent that the driver is thinking that he/she wants to start the vehicle. Therefore, the second conditions are also set as the conditions for determining the engine stall lock non-necessity determined state, and it is determined whether or not both the first condition and the second conditions are satisfied. As a result, it is possible to determine whether the engine stall lock non-necessity confirmation state is obtained, while more effectively taking into account the driver's intention to start the vehicle. Note that each of the conditions described above as the second conditions may be satisfied by noise. Therefore, in order to eliminate such a case, it is preferable to set an engine torque determination time period, an engine rotation speed determination time period, a clutch stroke determination time period, a dragging determination time period, and an inclination determination time period, so as to eliminate changes of the respective signals caused by noise and to determine that each of the conditions is satisfied only when each of the time periods is satisfied. Note that it may also be acceptable that only one of the engine torque and the engine rotation speed is observed.

When the above-described first condition and second conditions are satisfied, it can be determined that the engine stall lock non-necessity confirmation state is obtained. However, it can be also considered that a case is arising in which the dragging of the brake is already occurring. In such a case, it is preferable to release the accelerator release standby state. Therefore, as a condition for determining a state in which the dragging of the brake is occurring, it is determined whether or not a state, in which the vehicle speed is less than a dragging occurrence vehicle speed threshold value, is maintained for a period of time equal to or longer than the dragging determination time period, even in a situation in which the engine torque is exceeding the target engine torque and the clutch stroke is exceeding the target clutch stroke. More specifically, if the vehicle speed does not increase even when the driver is appropriately depressing the accelerator pedal and performing the clutch pedal operation to the extent that the driver is thinking that he/she wants to start the vehicle, it is considered that a state exists in which the dragging of the brake is occurring. Thus, when this condition is satisfied, as it is considered that the state exists in which the dragging of the brake is occurring, even when the first condition and the second conditions are not satisfied, the accelerator release standby state is caused to be released, thereby inhibiting the dragging of the brake.

However, regardless of whether or not the conditions for determining the engine stall lock non-necessity confirmation state or the conditions for determining the state in which the dragging of the brake is occurring are satisfied, in some cases, it is preferable that the accelerator release standby state be maintained. For example, when the ESC-ECU 8 causes traction control (TRC (registered trademark)) or antiskid control (ESC) to be actuated by controlling various types of the control valves and the pump drive motor that are provided in the actuator 7, it is highly likely that the state of the vehicle becomes unstable when an engine stall occurs because a state of the vehicle is not stable. Further, it is possible that the vehicle is put into the unstable state when the vehicle falls into an engine stall while the vehicle is a state of turning. In those cases, it is preferable to maintain the accelerator release standby state. By doing so, it is possible to inhibit a case in which it is determined that the engine stall lock non-necessity confirmation state is obtained even though it is highly likely that an engine stall will occur. Further, as the braking force is promptly generated to stop the vehicle at the time when the engine stall occurs, it is possible to inhibit the vehicle from being put into the unstable state.

Therefore, at step 620a, it is also determined whether neither the TRC nor the ESC is being performed, and further, whether an absolute value of the lateral acceleration, which is detected based on the detection signal from the lateral acceleration sensor 27, is equal to or less than a threshold value (0.2 G, for example) at which it is assumed that the vehicle is not turning. Then, the positive determination is made in the engine stall lock non-necessity confirmation determination, only when the above-described conditions for determining the engine stall lock non-necessity confirmation state and for determining the state in which the dragging of the brake is occurring are satisfied, neither the TRC nor the ESC is being performed, and the vehicle is not turning.

After that, the processing advances to step 620b, and the counting of the time elapsed after the accelerator release standby state is started is reset. Then, the processing advances to step 620c, and the engine stall lock non-necessity confirmation determination processing is terminated while indicating that the engine stall lock non-necessity determined state is obtained by turning on an engine stall lock non-necessity determined state flag, for example.

When the engine stall lock non-necessity confirmation determination processing is terminated in this manner, the processing advances to step 630 in FIG. 9, and it is determined whether or not the engine stall lock non-necessity confirmation state is obtained. Here, if the engine stall lock non-necessity confirmation state flag is on, it is necessary to perform the EPB standby cancel release control. Thus, when a positive determination is made here, the processing advances to step 640, and the EPB standby cancel release control is performed. When a negative determination is made here, the processing is terminated straight away. Then, until it is determined that the EPB state is the released state at step 650, the EPB standby cancel release control is repeatedly performed. After that, when the EPB state is put into the released state, the processing advances to step 660, and after the engine stall lock non-necessity confirmation state is switched off, the standby cancel release control determination is terminated.

Figure 16:
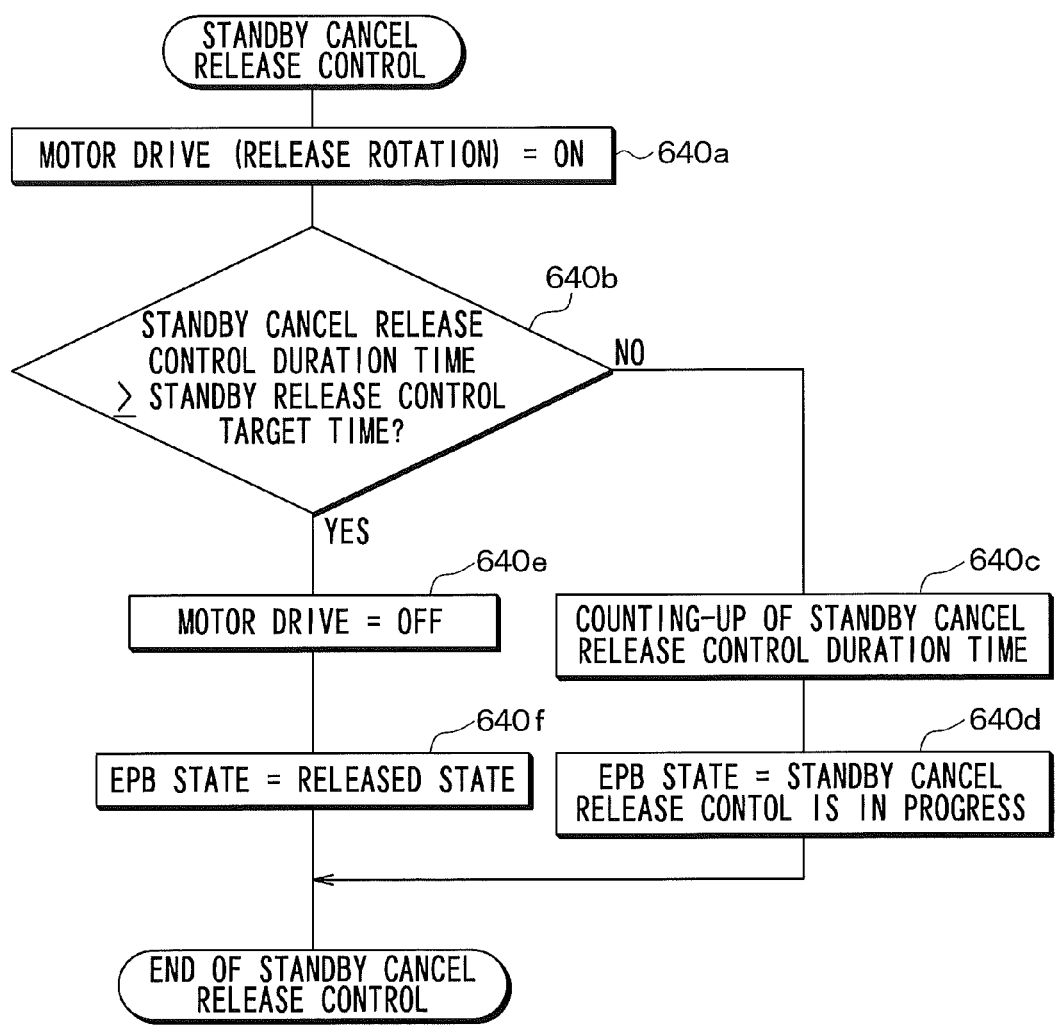
FIG. 16 is a flowchart showing details of an EPB standby cancel release control.

FIG. 16 is a flowchart showing details of the EPB standby cancel release control. In this processing, as the vehicle has been able to be started normally without an engine stall occurring, control is performed for returning the standby position of the EPB 2 from the standby position for the under-engine-stall lock control to the released position.

First, at step 640a, the motor drive is turned on. In other words, the motor 10 is caused to rotate in the reverse direction, which causes the wheel to be put into the released state. Along with the reverse rotation of the motor 10, the spur gear 15 is driven and the spur gear 16 and the rotation shaft 17 are rotated. Then, the meshing between the male screw groove 17a and the female screw groove 18a causes the propeller shaft 18 to be moved in the separating direction with respect to the disc brake 12. Along with that, the piston 19 is also caused to be moved in the same direction, thereby causing the brake pads 11 to be separated from the brake disc 12.

Next, the processing advances to step 640b, and it is determined whether or not a standby cancel release control duration time has exceeded a standby cancel release control target time. The standby cancel release control duration time is a time elapsed after the standby cancel release control is started. For example, when the motor drive is turned on at step 640a, a counting-up of a standby cancel release control duration time counter, which is not shown in the drawings, is started at step 640c, which will be described below. When the counter has reached a number of counts that corresponds to the standby time release control target time, it is determined that the standby cancel release control duration time has exceeded the standby cancel release control target time. Further, the standby cancel release control target time is a time that is assumed to be required for the propeller shaft 18 to be moved from the standby position, which is obtained in the above-described under-engine-stall lock control processing, to the release position, namely, to the standby position in which the clearance between the leading end of the propeller shaft 18 and the bottom portion of the piston 19 is maintained to be the clearance a as shown in FIG. 3(a). The standby cancel release control target time is set based on the movement amount of the propeller shaft 18 that corresponds to the rotation speed of the motor 10, etc.

Then, until a positive determination is made at step 640b, the processing advances to step 640c, and the counting-up of the standby cancel release control duration time counter is performed. After that, the processing advances to step 640d, and the processing is terminated while indicating that the EPB state is a state in which the standby cancel release control is in progress by setting a standby cancel release control in progress flag, for example. Then, the processing at steps 640c and 640d is caused to be performed repeatedly. On the other hand, when the positive determination is made at step 640b, the processing advances to step 640e, and the motor drive is turned off. After that, the processing advances to step 640f, and it is indicated that the EPB state is the released state by resetting the release control in progress flag and setting the released state flag, for example. In this manner, the standby cancel release control determination processing is completed.

Figure 17:
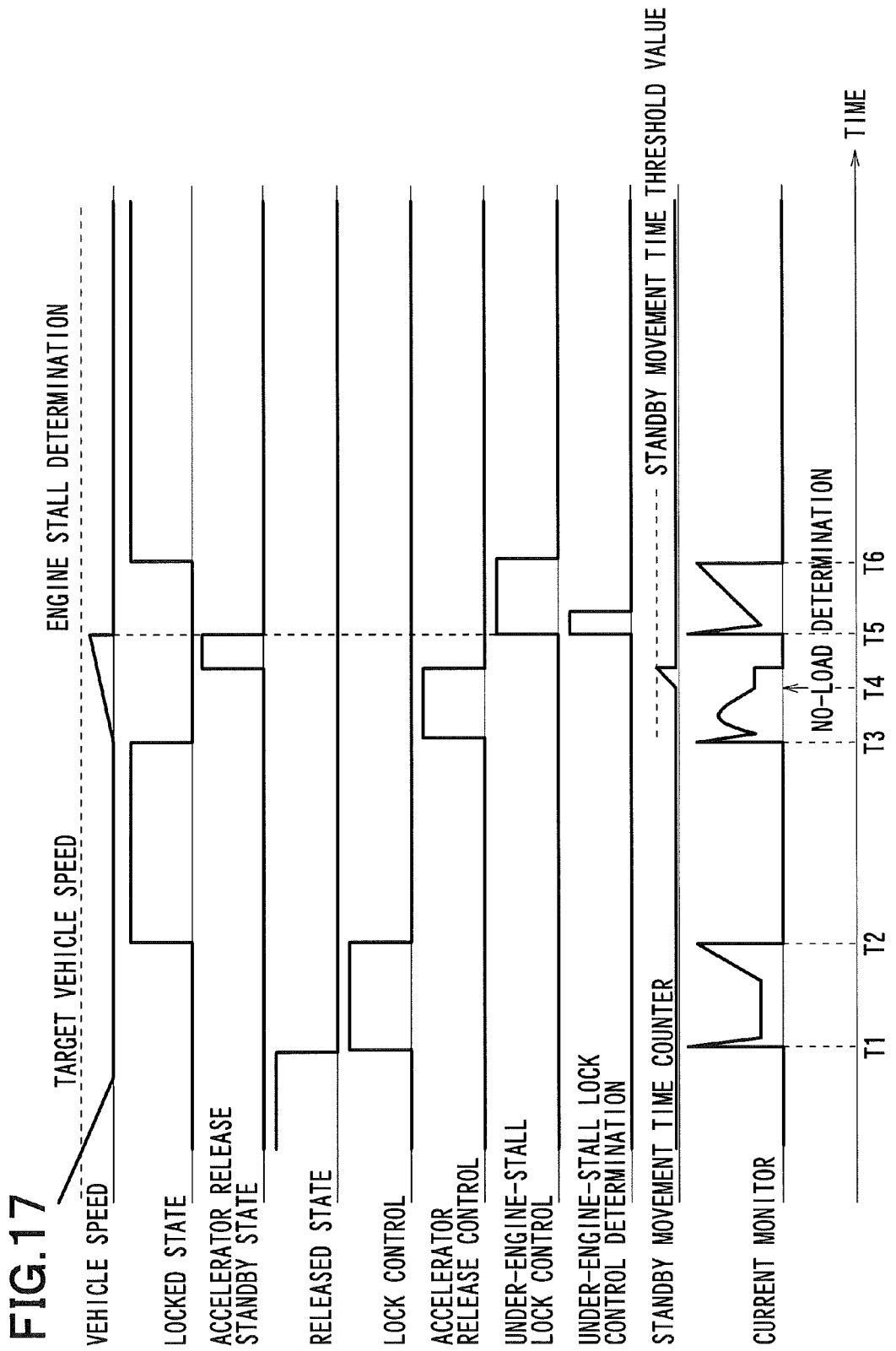
FIG. 17 is a timing chart of a case in which the EPB control processing is performed.

The EPB control processing is terminated as described above. FIG. 17 is a timing chart of a case when the above-described EPB control processing is performed. FIG. 17 is also a timing chart of a case when an engine stall occurs on a slope.

As shown in FIG. 17, the timing chart before a time point T1 shows a state in which the vehicle is stopped. The state is the released state and is not put into any other state. When the vehicle is stopped in this state, and then the lock control is started as a result of the operation SW 23 being operated on a slope, for example, the state is obtained in which the lock control is in progress from the time point T1 onward. Then, the motor current is monitored and the rush current is generated. After that, when the current monitor value reaches the target lock current value at a time point T2, the lock control is completed and the locked state is obtained.

Figure 18:
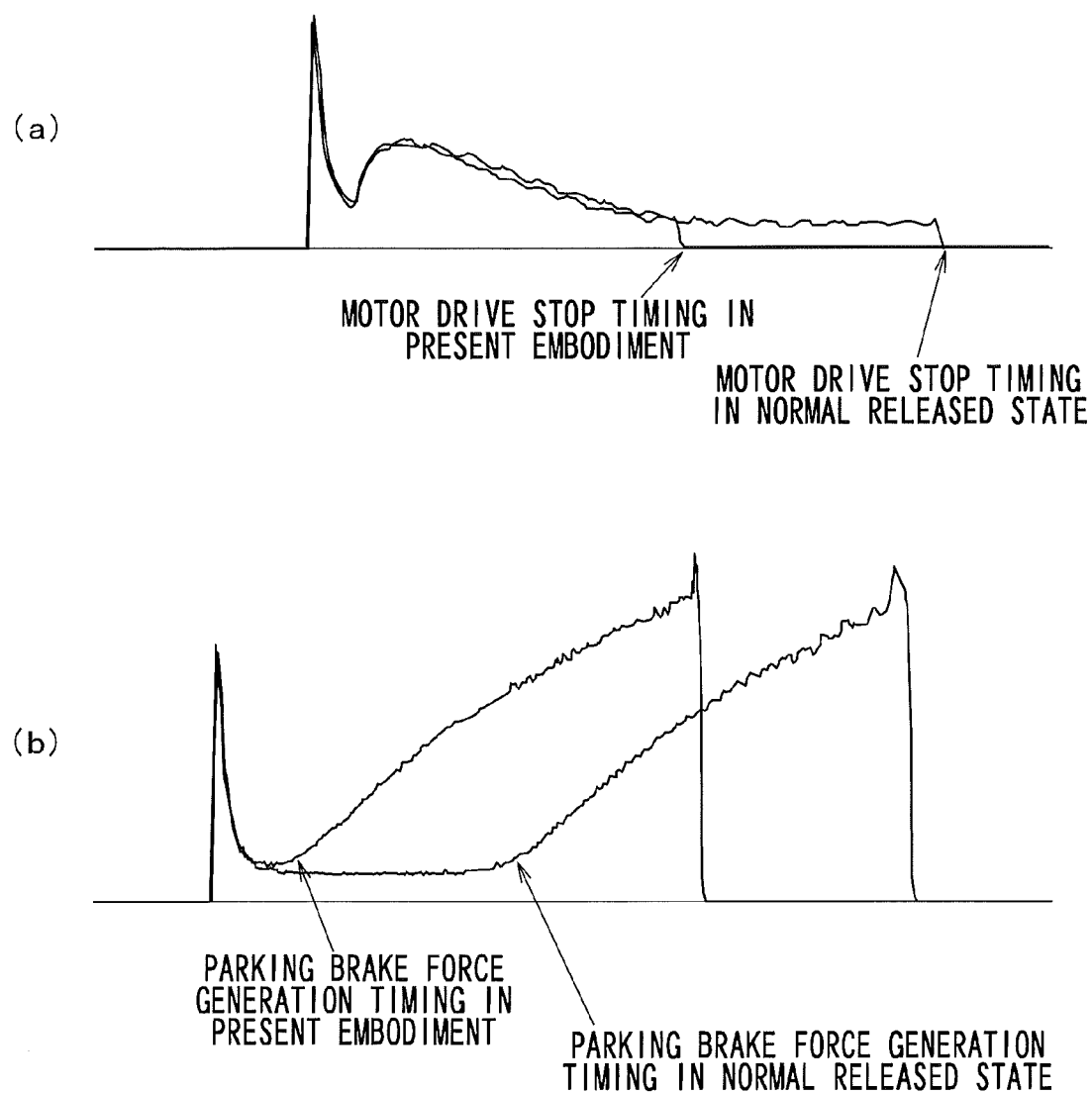
FIG. 18(a) is a timing chart showing timings when a motor drive is stopped.
FIG. 18(b) is a timing chart showing changes in the motor current.

Then, at a time point T3, the accelerator release control is performed simultaneously as the driver tries to start the vehicle. Then, the current monitor value of the motor current is checked and the rush current is generated. After that, when it is determined that the no-load state is obtained at a time point T4 and the no-load determination is turned on, after the motor drive is continuously performed until the standby movement time counter reaches the standby movement time threshold value, the motor drive is stopped and the accelerator release standby state is obtained. More specifically, as shown in FIG. 18(a), in the case when the normal released state is applied, after the no-load state is obtained, the motor drive is continuously performed until the clearance between the leading end of the propeller shaft 18 and the bottom portion of the piston 19 becomes the clearance a. However, in the case of the present embodiment, after the no-load state is obtained, the motor drive is stopped in a short time.

When an engine stall occurs in this state at a time point T5, the under-engine-stall lock control determination is turned on. By this, the under-engine-stall lock control is started. At that time, the accelerator release standby state has been already obtained, and the standby position of the EPB 2 is either in the first standby positon or the second standby position. Thus, it becomes possible to generate the parking brake force immediately after the engine stall time lock control is started. More specifically, as shown in FIG. 18(b), when the normal released state is obtained, after the no-load state is maintained for a period of time corresponding to the clearance a, the motor current increases as a result of the brake pads 11 being pressed against the brake disc 12. However, in the case of the present embodiment, the motor current starts increasing within a short period of time. As the parking brake force is generated from an earlier point in time in this manner, it is possible to more effectively inhibit the vehicle from sliding downward. Then, at a time point T6, when the current monitor value of the motor current reaches the maximum target lock current value, the under-engine-stall lock control is completed, and the locked state is obtained again.

Figure 19:
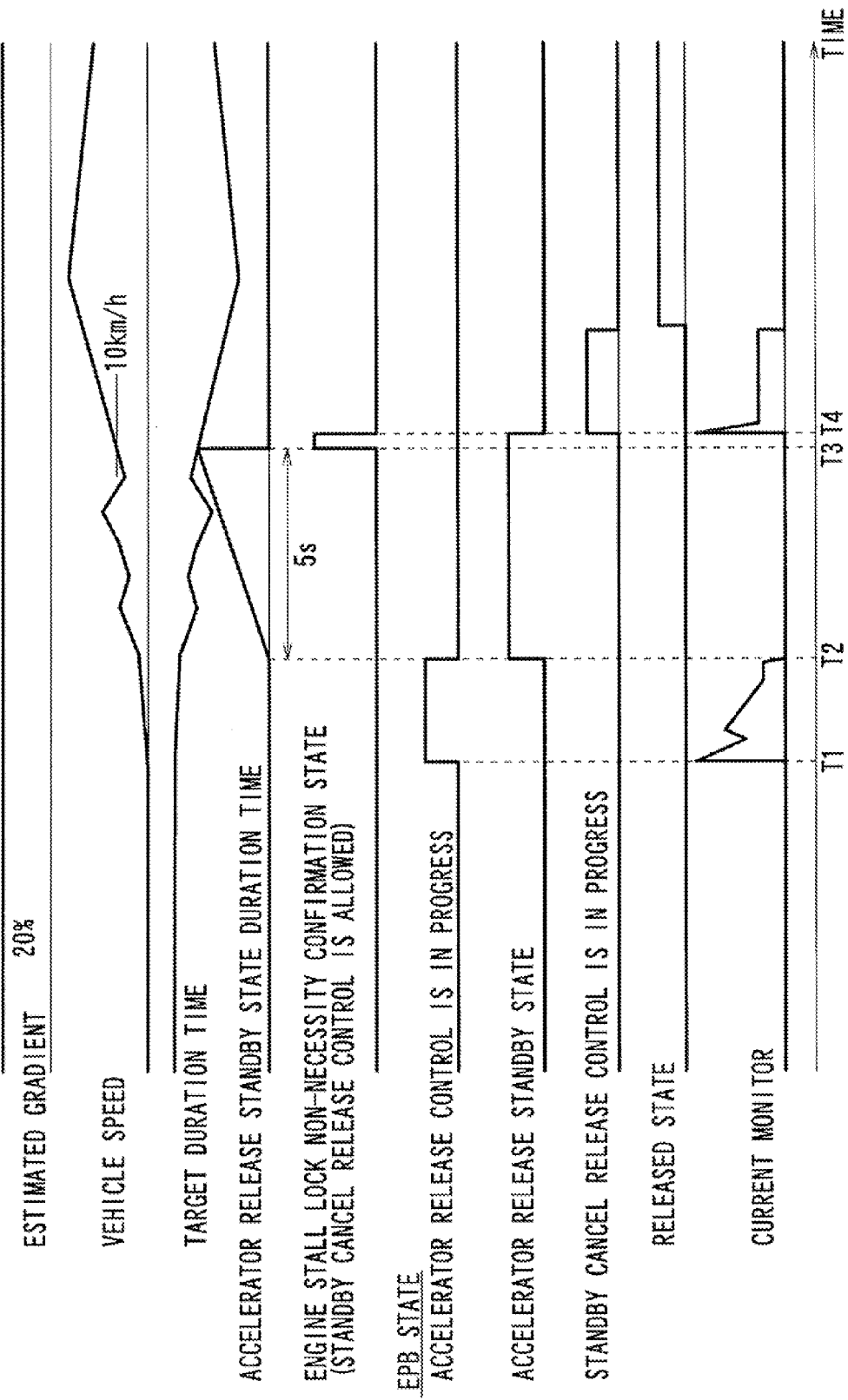
FIG. 19 is a timing chart of a case in which the vehicle is started normally on a slope without an engine stall occurring.
Figure 20:
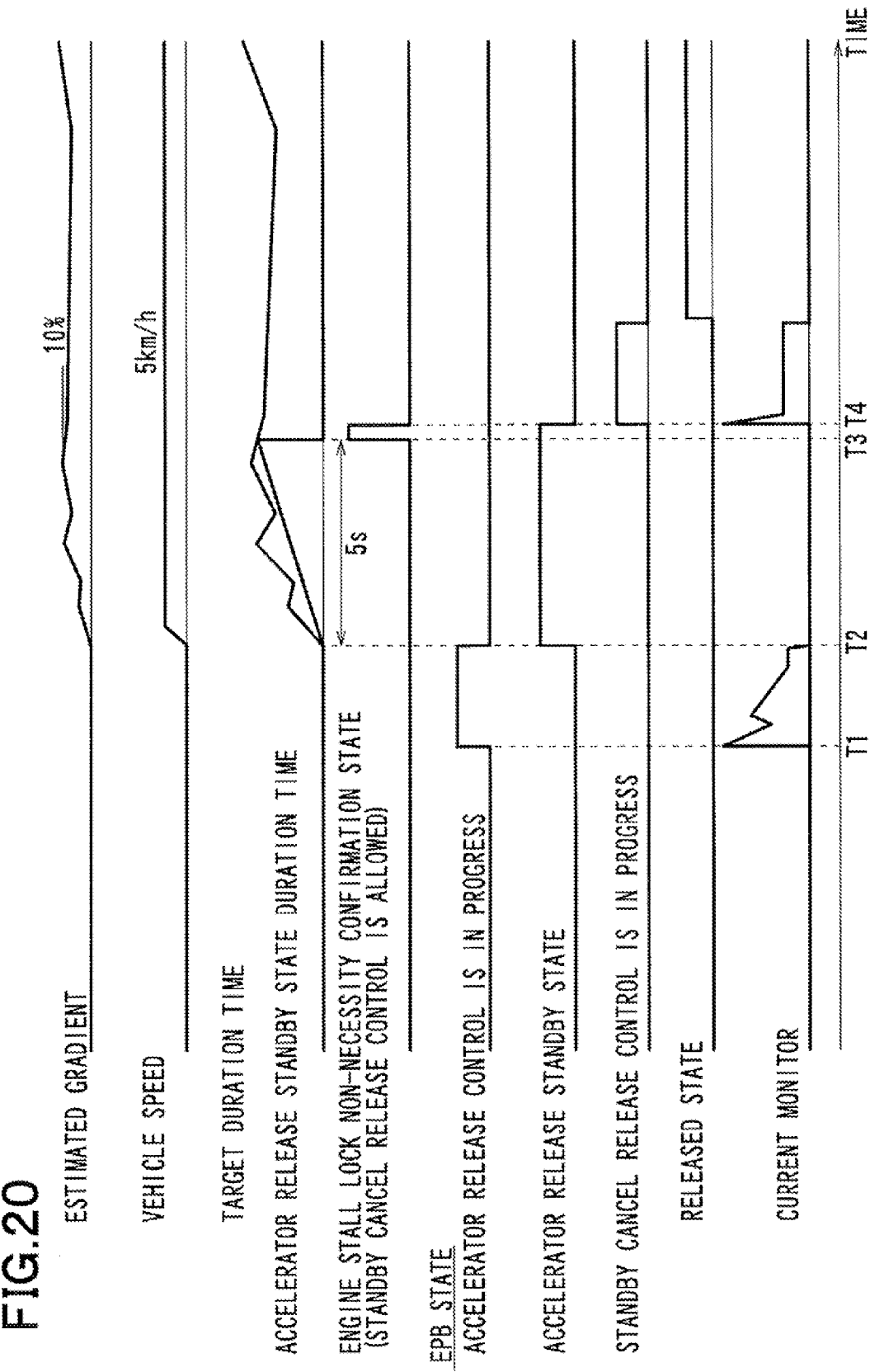
FIG. 20 is a timing chart of the case in which the vehicle is started normally on a slope without an engine stall occurring.

FIG. 19 and FIG. 20 are timing charts of a case in which the vehicle is started normally on a slope without an engine stall occurring. FIG. 19 shows a case in which the gradient is constant and the vehicle speed changes, and FIG. 20 shows a case in which the vehicle speed is constant and the gradient changes.

As shown in FIG. 19 and FIG. 20, the accelerator release control is performed from the time point T1 to T2 in the same manner as performed from the time point T3 to T4 in FIG. 17. As a result, the accelerator release standby state is obtained. At that time, when the under-engine-stall lock control determination is not on, the engine stall lock non-necessity confirmation determination processing is performed, and an engine stall non-necessity confirmation time is set based on the above-described map shown in FIG. 15. Then, at the time point T3, when the time elapsed after the accelerator release standby state is started reaches the engine stall non-necessity confirmation time (For example, 5 s (=gradient 20% with the vehicle speed of 10 km/h or gradient 10% with the vehicle speed is 5 km/h), the engine stall lock non-necessity confirmation state is turned on, and the standby cancel release control is allowed to be performed. By this, standby cancel release control is performed from the time point T4, and at the time point T5, the accelerator release standby state is released and then put into the released state.

Note that, as the gradient of the road surface is constant (20% in this case) while the vehicle speed changes in FIG. 19, and the vehicle speed is constant (5 km/h in this case) while the gradient of the road surface changes in FIG. 20, the engine stall non-necessity confirmation time is updated every time after each of the control cycles. Thus, when the time elapsed after the accelerator release standby state is started reaches the updated engine stall non-necessity confirmation time, the standby cancel release control is performed.

In this manner, in the electric parking brake control device according to the present embodiment, when the vehicle is stopped on a slope, the standby position of the propeller shaft 18 is caused to be closer to the locked position than to the released position, namely, caused to be in the first or second standby position, in which the brake pads 11 can be pressed against the brake disc 12 within a shorter period of time. By this, it becomes possible to improve the responsiveness of the EPB 2 so as to generate the parking brake force more quickly at the time of an engine stall, and it is possible to inhibit the vehicle from sliding downward.

Then, in the case after the responsiveness of the EPB 2 is improved so as to inhibit the vehicle from sliding downward in this manner, it is accurately determined whether the engine stall lock non-necessity confirmation state is obtained, and immediately after the engine stall lock non-necessity confirmation state is obtained, the standby cancel release control is performed. Thus, it becomes possible to return the clearance between the brake disc 12 and the brake pads 11 to that of the normal released state immediately after the engine stall lock non-necessity confirmation state is obtained. Therefore, it is possible to inhibit the dragging of the brake when the vehicle is started. Thus, it is also possible to inhibit noise, vibration, or overheating of the brake from being caused by the dragging of the brake.

Further, in accordance with the inclination of the road surface on which the vehicle is stopped, it is possible to select the first or the second standby position. As a result, it is possible to set the standby position based on whether or not a situation exists in which the parking brake force should be generated more quickly, even when the dragging feeling of the brake is felt by the driver or the brake is squeaking.

Note that, in the above-described explanation, although the case has been described in which the accelerator release control is performed after the EPB state is put into the locked state, the accelerator release control can also be performed when the vehicle is stopped on a slope and then restarted while the lock control is in progress before the locked state is obtained. Therefore, as shown at step 410 in FIG. 7, even when the EPB is not in the locked state but in the state in which the lock control is in progress, it is preferable to cause the accelerator release control to be performed. Further, the electric actuator may be actuated so as to cause a transfer to the standby position, when the vehicle is started from the released position.

Other Embodiments

In each of the above-described embodiments, the case has been described in which a structure, in which the service brake 1 and the brake mechanism of the EPB 2 are integrated, is used as the EPB 2, as shown in FIG. 2. However, the structure is merely shown as one example, and the present invention can also be applied to a brake structure in which the service brake 1 and the EPB 2 are completely separated from each other.

Further, in each of the above-described embodiments, although the disc brake type EPB 2 is used as an example, the EPB 2 of another type, including a drum brake type or the like, may also be used. In that case, the friction-applying member and the friction-applied member become a brake shoe and a drum, respectively.

Further, in the above-described embodiment, although the first or the second standby position can be selected to set the standby position in accordance with the inclination of the road surface, the standby position may also be determined in accordance with the inclination of the road surface by selecting the standby movement time threshold value based on a map showing a relationship between the inclination of the road surface and the standby movement time threshold value, for example.

Further, in each of the above-described embodiments, although under-impossible-to-start lock control is performed at the time when the vehicle is in the impossible-to-start state, the under-impossible-to-start lock control need not necessarily be performed in an embodiment. Even in this case, if the driver performs an EPB operation or a braking operation of the service brake, when it becomes impossible to start the vehicle due to an engine stall or the like, the standby position is obtained by the accelerator release control. As a result, it is possible to reduce the sliding downward amount of the vehicle and to inhibit the dragging of the brake by determining that the non-necessity confirmation state is obtained and by quickly returning the clearance back to that of the normal released state.

Note that the steps shown in each of the diagrams correspond to means for performing various types of processing. More specifically, in the EPB-ECU 9, a part that performs the processing at step 200 corresponds to lock control means, a part that performs the processing at step 300 to release control means, a part that performs the processing at step 400 corresponds to accelerator release control determining means, a part that performs the processing at step 530 corresponds to start state determining means, a part that performs the processing at step 550 corresponds to under-impossible-to-start lock control means, a part that performs the processing at step 620 corresponds to non-necessity confirmation determining means, and a part that performs the processing at step 640 corresponds to standby cancel release control means.

REFERENCE SIGNS LIST

1 . . . Service brake
2 . . . EPB
5 . . . M/C
6 . . . W/C
7 . . . ESC actuator
8 . . . ESC-ECU
9 . . . EPB-ECU
10 . . . Motor
11 . . . Brake pad
12 . . . Brake disc
18 . . . Propeller shaft
18*a* . . . Female screw groove
19 . . . Piston
23 . . . Operation SW
24 . . . Lock/release display lamp
25 . . . Front-rear G sensor
26 . . . Pedal stroke sensor
27 . . . Lateral acceleration sensor
28 . . . Engine ECU

The invention claimed is:

1. An electric parking brake control device that controls an electric actuator that drives an electric parking brake, the electric parking brake control device comprising:

lock control means that performs lock control for moving a friction-applying member to a locked position at which a predetermined braking force is generated, by actuating the electric actuator such that, in the electric parking brake, the friction-applying member is pushed against a friction applied member;

release control means that performs release control for moving the friction-applying member to a released position in which the friction-applying member is separated from the friction-applied member, at a time when the electric parking brake is not actuated;

accelerator release control means that performs accelerator release control for moving the friction-applying member to a standby position when a vehicle starting operation is performed, the standby position being positioned between the locked position and the released position such that the friction-applying member moves caused by operation of the electric actuator from the standby position to the locked position within a time which is shorter than a time required to move from the released position to the locked position; and non-necessity confirmation determining means for determining whether it is unnecessary to maintain the standby position, based on whether a state in which a vehicle speed, which is a speed of the vehicle, exceeds a specific speed threshold value is maintained for a predetermined period of time, wherein the release control is performed when the non-necessity confirmation determining means determines that it is unnecessary to maintain the standby position, the electric actuator generates a brake force by causing a nut to contact a piston such that the friction-applying member is pressed against the friction-applied member, and the standby position is a position at which a brake force of the electric parking brake is not generated, and a clearance between the piston and the nut in the standby position is smaller than a clearance between the piston and the nut in the release position.

2. The electric parking brake control device according to claim 1, wherein the accelerator release control means performs the accelerator release control when the vehicle starting operation is performed in the lock control or in a locked state, the locked state is a state in which the locked position is continued to be maintained.

3. An electric parking brake control device that includes:
lock control means that performs normal lock control for moving a propeller shaft in one direction by causing a motor to rotate in a forward direction, for generating a parking brake force by moving a friction-applying member in connection with movement of the propeller shaft in a direction approaching to a friction applied member mounted on a wheel, and, after generation of the parking brake force, for putting a wheel into a locked state by stopping operation of the motor and by maintaining the parking brake force;

release control means that performs release control for moving the propeller shaft in an opposite direction to the one direction by causing the motor to rotate in a reverse direction, for reducing a parking brake force by moving the friction-applying member in connection with movement of the propeller shaft in a direction separating from the friction applied member, and, after reduction of the parking brake force, for putting a wheel into a released state by stopping operation of the motor, the electric parking brake control device comprising:
accelerator release control determining means for causing the propeller shaft to be moved to a standby position, which is positioned between a locked position in which the locked state is obtained and a released position in which the released state is obtained, when a vehicle starting operation is performed in the lock control or in the locked state;

starting state determining means for determining whether a vehicle is in an impossible-to-start state in which a vehicle cannot start travelling after the vehicle starting operation is performed;

standby cancel release control means for performing the release control to cause the propeller shaft to be moved from the standby position to the released position when the starting state determining means has not determined that the vehicle is in the impossible-to-start state;

under-impossible-to-start lock control means for performing under-impossible-to-start lock control to generate a parking brake force by moving the propeller shaft in the one direction as a result of the motor being driven and rotated in the forward direction when the starting state determining means determines the vehicle is in the impossible-to-start state; and non-necessity confirmation determining means for determining whether a non-necessity confirmation state is obtained in which it is unnecessary to perform the under-impossible-to-start lock control, based on whether a state in which a vehicle speed exceeds a specific speed threshold value is maintained for a period of time equal to or longer than a predetermined time threshold value;

wherein
the standby cancel release control means causes the release control to be performed to move the propeller shaft from the standby position to the released position when the starting state determining means has not determined that it is impossible to start the vehicle and when the non-necessity confirmation determining means has determined that the non-necessity confirmation state is obtained.

4. The electric parking brake control device according to claim 3, wherein
the specific speed threshold value is set to a larger value as a gradient of a road surface on which the vehicle is driven becomes larger.

5. The electric parking brake control device according to claim 3, wherein
the time threshold value is set to a larger value as a gradient of a road surface on which the vehicle is driven becomes larger.

6. The electric parking brake control device according to claim 3, wherein
the non-necessity confirmation determining means determines that the non-necessity confirmation state is obtained when both a first condition and a second condition are satisfied, the first condition being satisfied when a state in which the vehicle speed exceeds a specific speed threshold value is maintained for a period of time equal to or longer than a predetermined time threshold value, and the second condition being satisfied when a state is obtained in which an engine torque exceeds a pre-set target engine torque or an engine rotation speed exceeds a pre-set target engine rotation speed and when a state is obtained in which an operation amount of a clutch of the vehicle exceeds a pre-set target operation amount.

7. The electric parking brake control device according to claim 3, wherein
the non-necessity confirmation determining means determines that the non-necessity confirmation state is obtained if a state in which the vehicle speed exceeds a specific speed threshold value is maintained for a period of time equal to or longer than a predetermined time threshold value, when neither traction control nor anti-skid control is actuated.

8. The electric parking brake control device according to claim 3, wherein
the non-necessity confirmation determining means determines that the non-necessity confirmation state is obtained if a state in which the vehicle speed exceeds the specific speed threshold value is maintained for the period of time equal to or longer than the predetermined time threshold value, when the vehicle is not turning.

9. The electric parking brake control device according to claim 3, wherein
the non-necessity confirmation determining means determines that the non-necessity confirmation state is obtained when a state in which the vehicle speed is less than a certain value is maintained for a period of time equal to or longer than a certain period of time even in a situation in which the engine torque exceeds a pre-set target engine torque and an operation amount of a clutch exceeds a target operation amount.

* * * * *